US010871880B2

(12) United States Patent
Hatfield et al.

(10) Patent No.: US 10,871,880 B2
(45) Date of Patent: Dec. 22, 2020

(54) ACTION-ENABLED INKING TOOLS

(71) Applicant: Microsoft Technology Licensing, LLC, Redmond, WA (US)

(72) Inventors: L. Tucker Hatfield, Kirkland, WA (US); Ian William Mikutel, Redmond, WA (US); Emily Tran, Seattle, WA (US); Alex J. Simmons, Kirkland, WA (US); Lisa Carolyn Cherian, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 227 days.

(21) Appl. No.: 15/344,439

(22) Filed: Nov. 4, 2016

(65) Prior Publication Data
US 2018/0129367 A1 May 10, 2018

(51) Int. Cl.
*G06F 3/0482* (2013.01)
*G06F 40/171* (2020.01)
(Continued)

(52) U.S. Cl.
CPC ........ *G06F 3/0482* (2013.01); *G06F 3/04817* (2013.01); *G06F 3/04883* (2013.01);
(Continued)

(58) Field of Classification Search
CPC .. G06F 3/0482; G06F 3/04883; G06F 17/242; G06F 3/04817; G06F 40/171; G06K 9/00402
See application file for complete search history.

(56) References Cited

U.S. PATENT DOCUMENTS 5,068,644 A * 11/1991 Batson ............... G09G 5/02
345/601
5,694,563 A * 12/1997 Belfiore ............. G06F 3/0481
715/811
(Continued)

FOREIGN PATENT DOCUMENTS

WO 2009032795 A1 3/2009

OTHER PUBLICATIONS

Runciman, Kyle, "Guide to Custom Brushes", http://cdn.sketchbook.com/blog/wp-content/uploads/2015/08/kyle-tutorial_Brushes.pdf, Nov. 2, 2012, pp. 1-15.
(Continued)

*Primary Examiner* — Justin R. Blaufeld

(57) ABSTRACT

A tool for action tool-integrated inking input is provided. In one example, a user selects an inking tool and further selects an action functionality to apply to the inking tool. The inking tool is highlighted and updated to display the selected functionality. In another example, the user selects an action tool having a particular functionality and further selects inking properties to apply to the action tool. The action tool is highlighted and updated to display the selected inking properties. In another example, a tool is provided, and the user selects an action functionality and inking properties to apply to the tool. The action tool is updated to illustrate the selected functionality and properties. In another example, the user selects an inking tool and an action tool to apply properties associated with the inking tool and the functionality associated with the action tool to an active tool.

19 Claims, 20 Drawing Sheets

(51) Int. Cl.
*G06F 3/0481* (2013.01)
*G06F 3/0488* (2013.01)
*G06F 3/0484* (2013.01)
*G06K 9/00* (2006.01)

(52) U.S. Cl.
CPC ....... *G06F 40/171* (2020.01); *G06K 9/00402* (2013.01); *G06F 3/04845* (2013.01)

(56) References Cited

U.S. PATENT DOCUMENTS

| | | | | |
|---|---|---|---|---|
| 6,337,698 | B1* | 1/2002 | Keely, Jr. | G06F 3/0483 715/777 |
| 7,106,343 | B1* | 9/2006 | Hickman | G06T 11/40 345/589 |
| 7,259,752 | B1* | 8/2007 | Simmons | G06F 3/04817 345/173 |
| 7,353,453 | B1* | 4/2008 | Simmons | G06F 40/169 715/268 |
| 7,602,405 | B2 | 10/2009 | Hsu | |
| 8,296,670 | B2* | 10/2012 | Matthews | G06F 3/04886 715/769 |
| 8,315,482 | B2 | 11/2012 | Hou et al. | |
| 8,482,539 | B2 | 7/2013 | Ogawa et al. | |
| 8,638,303 | B2* | 1/2014 | Harris | G06F 3/0412 345/173 |
| 8,692,847 | B2* | 4/2014 | Bhatt | G06F 3/0481 345/619 |
| 8,907,907 | B2 | 12/2014 | Kawasaki et al. | |
| 8,963,891 | B2* | 2/2015 | Mesaros | G06F 3/03545 345/179 |
| 9,354,707 | B2 | 5/2016 | Anderson et al. | |
| 9,459,794 | B1* | 10/2016 | Soegiono | G06F 3/04847 |
| 9,811,238 | B2* | 11/2017 | Henerlau | G06F 3/04883 |
| 2004/0021700 | A1* | 2/2004 | Iwema | G06K 9/033 715/863 |
| 2004/0070622 | A1* | 4/2004 | Cossey | G06F 9/543 715/769 |
| 2004/0117724 | A1* | 6/2004 | Szilagyi | G06F 40/171 715/200 |
| 2004/0225968 | A1* | 11/2004 | Look | G06Q 10/10 715/778 |
| 2005/0102620 | A1* | 5/2005 | Seto | G06K 9/222 715/268 |
| 2005/0144090 | A1* | 6/2005 | Gadamsetty | G06Q 30/0601 705/26.1 |
| 2005/0154991 | A1* | 7/2005 | Jaeger | G06F 3/0481 715/769 |
| 2005/0198590 | A1* | 9/2005 | Jarrett | G06F 3/0481 715/863 |
| 2005/0262481 | A1* | 11/2005 | Coulson | G06F 9/451 717/120 |
| 2006/0085767 | A1* | 4/2006 | Hinckley | G06F 3/04842 715/863 |
| 2006/0123329 | A1* | 6/2006 | Steen | G06F 40/253 715/270 |
| 2006/0212812 | A1* | 9/2006 | Simmons | G06F 3/04883 715/203 |
| 2006/0230351 | A1* | 10/2006 | Stehle | G06T 19/00 715/700 |
| 2006/0267967 | A1* | 11/2006 | Hinckley | G06F 3/038 345/179 |
| 2007/0094328 | A1* | 4/2007 | Birch | G06Q 10/10 709/204 |
| 2007/0109281 | A1* | 5/2007 | Simmons | G06F 3/0481 345/179 |
| 2007/0130541 | A1* | 6/2007 | Louch | G06F 3/04817 715/804 |
| 2007/0216684 | A1* | 9/2007 | Hsu | G06T 11/60 345/441 |
| 2008/0104527 | A1* | 5/2008 | Jaeger | G06F 3/0481 715/763 |
| 2008/0295036 | A1* | 11/2008 | Ikeda | G06T 11/206 715/848 |
| 2009/0228838 | A1* | 9/2009 | Ryan | G06F 8/38 715/853 |
| 2009/0231356 | A1* | 9/2009 | Barnes | G06F 3/04883 345/594 |
| 2009/0288044 | A1* | 11/2009 | Matthews | G06F 3/0482 715/863 |
| 2009/0304282 | A1* | 12/2009 | Predovic | G06K 9/00463 382/187 |
| 2010/0074527 | A1* | 3/2010 | Vukosavljevic | G06F 40/111 382/187 |
| 2010/0163316 | A1* | 7/2010 | Chang | G06K 9/00416 178/18.01 |
| 2010/0171754 | A1* | 7/2010 | Hatfield | G06K 9/00416 345/619 |
| 2010/0257182 | A1* | 10/2010 | Saliba | G06F 40/253 707/747 |
| 2010/0281374 | A1* | 11/2010 | Schulz | G06F 3/0482 715/723 |
| 2010/0306698 | A1* | 12/2010 | Sellers | G06K 9/222 715/805 |
| 2011/0072396 | A1* | 3/2011 | Giesen | G06F 3/0481 715/841 |
| 2011/0175821 | A1* | 7/2011 | King | G06F 3/04883 345/173 |
| 2011/0310031 | A1* | 12/2011 | Harris | G06F 3/0383 345/173 |
| 2012/0092268 | A1* | 4/2012 | Tsai | G06F 3/04883 345/173 |
| 2012/0105383 | A1* | 5/2012 | Silverbrook | G09B 5/02 345/179 |
| 2012/0210261 | A1* | 8/2012 | Sarnoff | G06F 3/04883 715/765 |
| 2012/0272144 | A1* | 10/2012 | Radakovitz | G06F 3/0482 715/702 |
| 2013/0120436 | A1* | 5/2013 | Krishnaswamy | G06T 11/40 345/594 |
| 2013/0127910 | A1* | 5/2013 | Tijssen | G06F 3/04842 345/642 |
| 2013/0132959 | A1* | 5/2013 | Moore | G06Q 30/02 718/100 |
| 2013/0212535 | A1* | 8/2013 | Kim | G06F 3/04886 715/841 |
| 2013/0235074 | A1* | 9/2013 | Cherna | G06F 3/04847 345/619 |
| 2013/0239056 | A1* | 9/2013 | Ubillos | G06F 3/0482 715/833 |
| 2013/0326381 | A1* | 12/2013 | Pereira | G06F 3/04845 715/765 |
| 2013/0330021 | A1* | 12/2013 | Bansal | G06T 11/60 382/309 |
| 2014/0013254 | A1* | 1/2014 | Hosein | G06F 3/0486 715/765 |
| 2014/0040789 | A1* | 2/2014 | Munter | G06F 3/04845 715/762 |
| 2014/0081610 | A1* | 3/2014 | DiVerdi | G06F 3/03545 703/6 |
| 2014/0098047 | A1* | 4/2014 | Son | G06F 3/0488 345/173 |
| 2014/0109004 | A1* | 4/2014 | Sadhvani | G06F 3/04842 715/810 |
| 2014/0165006 | A1* | 6/2014 | Chaudhri | G06F 3/04817 715/835 |
| 2014/0184538 | A1* | 7/2014 | Sato | G06F 3/041 345/173 |
| 2014/0229873 | A1* | 8/2014 | Tremblay | G06F 3/0346 715/771 |
| 2014/0272863 | A1* | 9/2014 | Kim | G06T 19/006 434/262 |
| 2014/0282077 | A1* | 9/2014 | Wilson | G06F 3/03545 715/751 |
| 2014/0310631 | A1 | 10/2014 | Harrison et al. | |
| 2014/0337748 | A1* | 11/2014 | Lee | H04M 1/7253 715/740 |

(56) References Cited

U.S. PATENT DOCUMENTS

| | | | | |
|---|---|---|---|---|
| 2014/0365850 A1* | 12/2014 | Maloney | G06F 3/04883 | 715/202 |
| 2015/0058807 A1* | 2/2015 | Anderson | G06T 11/80 | 715/825 |
| 2015/0067592 A1* | 3/2015 | Owen | G06F 3/04883 | 715/808 |
| 2015/0135129 A1* | 5/2015 | Kwon | G06F 3/04886 | 715/781 |
| 2015/0154444 A1* | 6/2015 | Kurita | G06K 9/00436 | 715/268 |
| 2015/0277708 A1* | 10/2015 | Rodrig | G06F 9/451 | 715/777 |
| 2015/0338938 A1* | 11/2015 | Vong | G06F 3/04842 | 345/179 |
| 2016/0085422 A1* | 3/2016 | Lee | G06F 40/171 | 715/810 |
| 2016/0154579 A1* | 6/2016 | Lee | G06K 9/00402 | 382/189 |
| 2016/0179335 A1* | 6/2016 | Thompson | G06F 3/04817 | 345/173 |
| 2016/0179364 A1* | 6/2016 | Nicholson | G06F 3/04883 | 715/863 |
| 2016/0260229 A1* | 9/2016 | Natzke | G06T 11/001 | |
| 2017/0068445 A1* | 3/2017 | Lee | G06F 3/0482 | |

OTHER PUBLICATIONS

"Paint tools: Brush, Clone Stamp, and Eraser", https://helpx.adobe.com/after-effects/using/paint-tools-brush-clone-stamp.html, Retrieved Date: Jan. 10, 2014, 17 pages.

Patterson, Steve, "Photoshop Color Replacement Tool Tutorial", Retrieved from <<https://www.photoshopessentials.com/photo-editing/color-replacement-tool/>>, Feb. 7, 2018, 4 Pages.

"International Search Report and Written Opinion Issued in PCT Application No. PCT/US2017/058644", dated Feb. 13, 2018, 14 Pages.

* cited by examiner

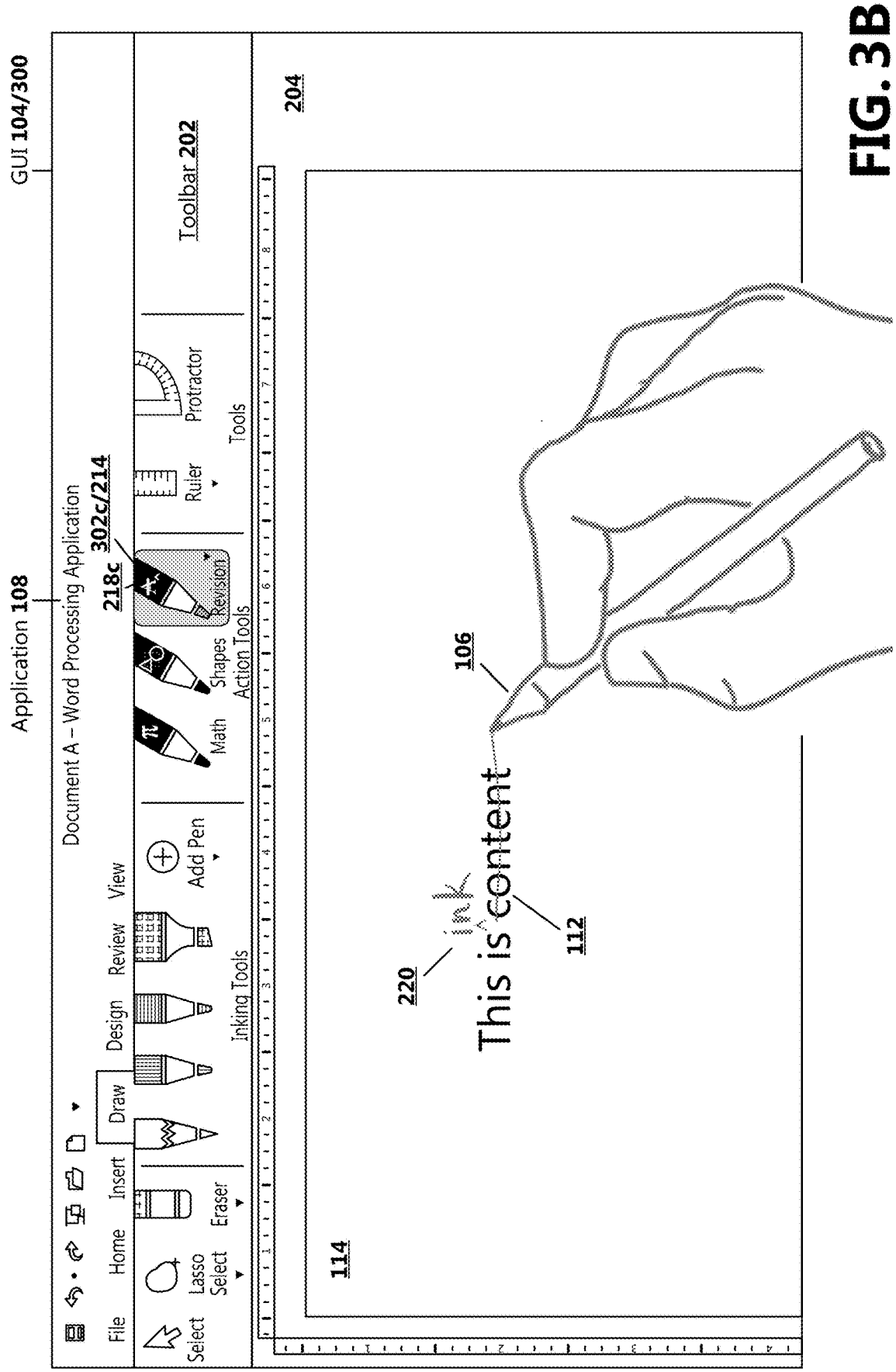

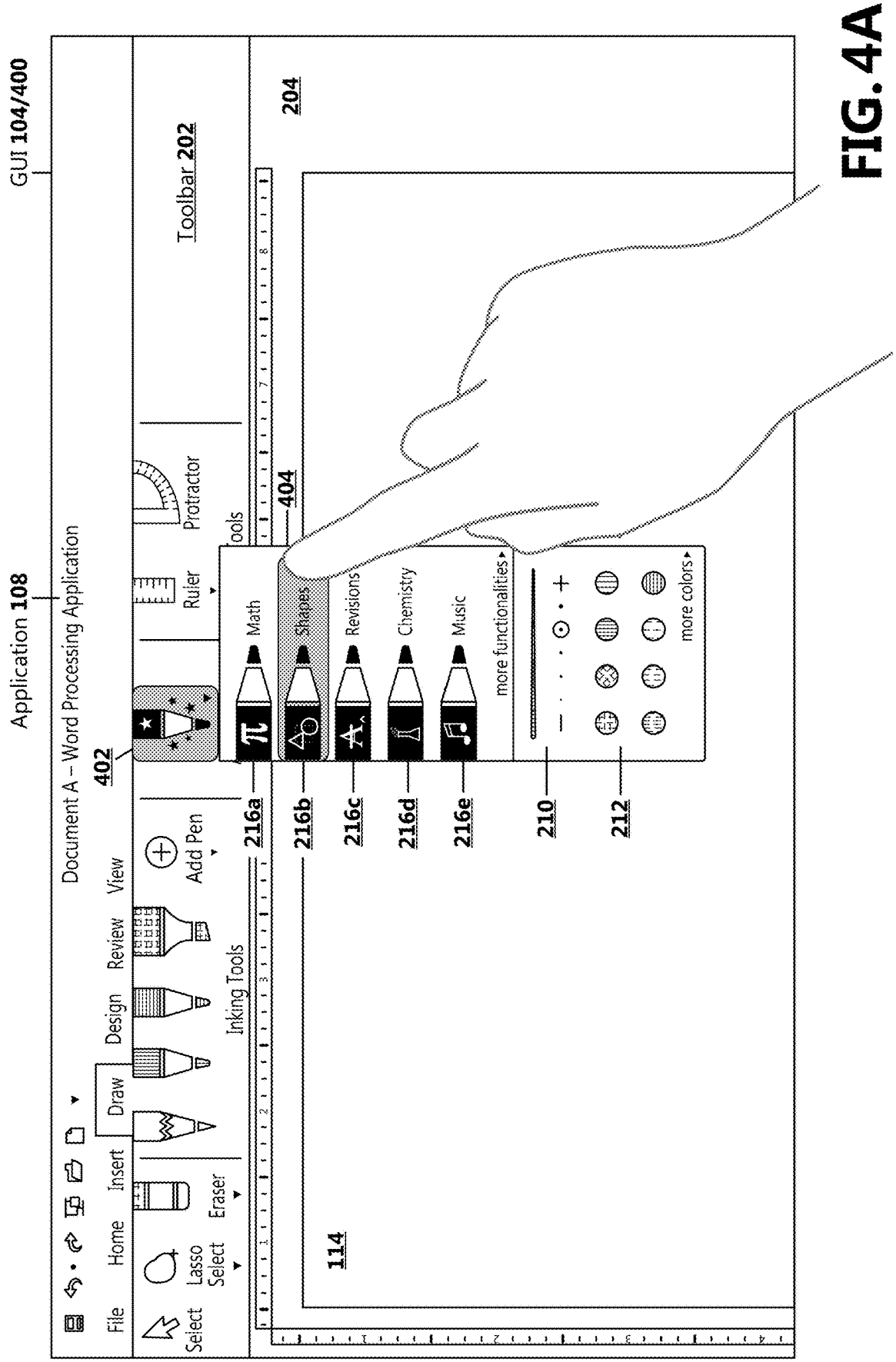

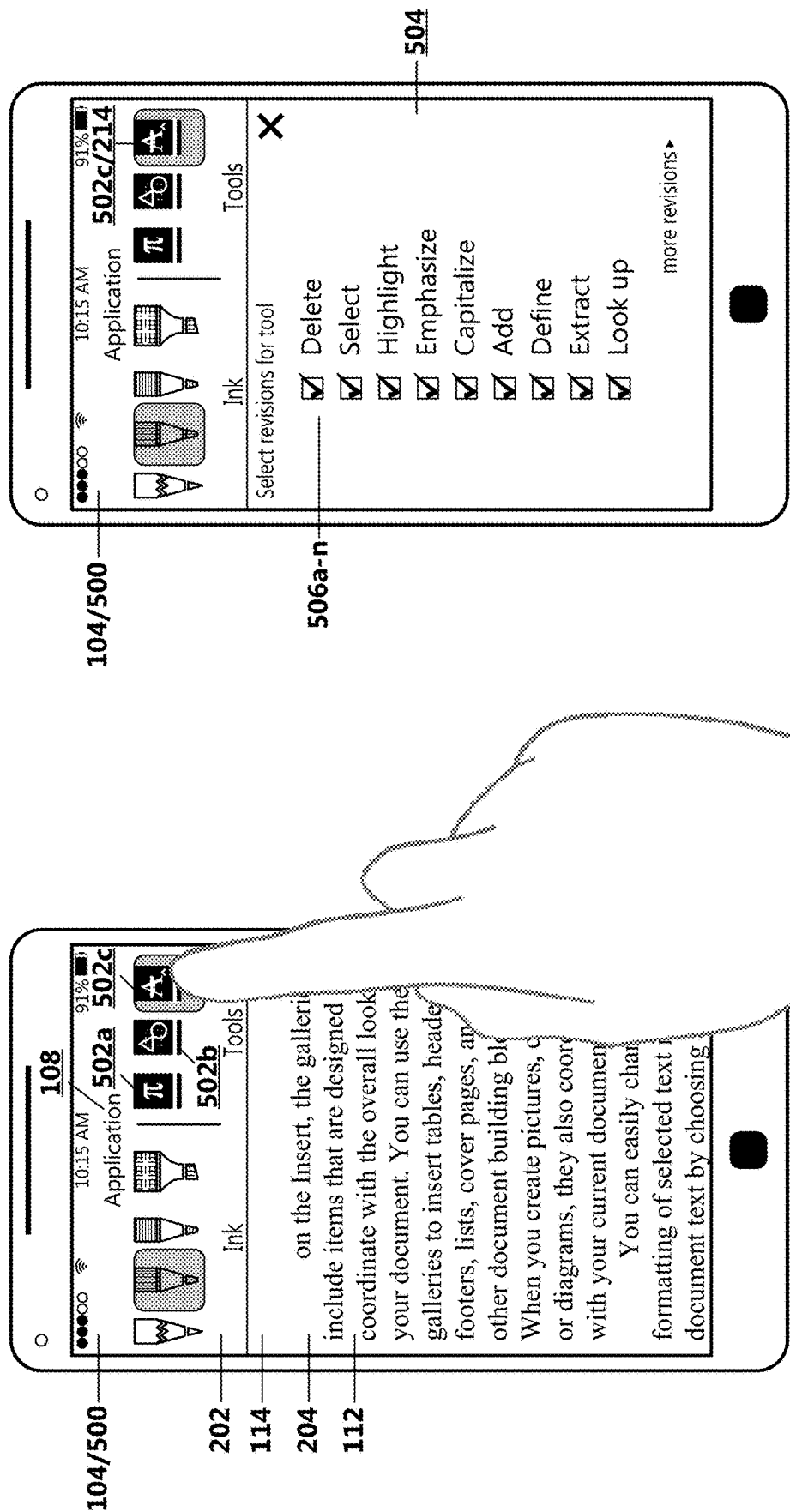

MOBILE COMPUTING DEVICE

US 10,871,880 B2

ACTION-ENABLED INKING TOOLS

BACKGROUND

Various types of computing devices and a variety of software applications enable "inking" input, wherein a user applies one or a plurality of stroke inputs, sometimes referred to as digital ink, to a user interface of a computing device. For example, some computing devices accept stroke input via natural user interface input methods (e.g., touch, gesture, or eye-tracking), via a handwriting input device (e.g., a digital pen or stylus), or by movement of a mouse pointer, touchpad pointer, etc. In some examples, inking input includes handwritten text, freeform drawings, handwritten markups, which may include text or symbols, etc.

Applications may further provide action tool functionalities for converting inking input into text, shapes, or annotations. In some examples, inking input may be identified as an executable command, and an application may take an action based on the identified command. In various examples, to enable such action tool functionalities, a user may selectively enter a particular mode, such as a shapes mode, a math mode, or a revisions mode. For example, the user may select a shapes mode button to cause the application to enter a shapes mode, where the user's inking input is analyzed and converted into a shape. Computer and software users have grown accustomed to user-friendly software applications that provide intuitive graphical user interfaces and efficient user experiences, and while such inking functionalities are useful, modes are typically difficult for users to understand and to remember to turn on or off.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for enabling improved usability of productivity applications by providing a tool for action tool-integrated inking input. By employing aspects of the present disclosure, an improved user experience is provided, where the user is enabled to efficiently select an integrated inking and action tool for providing freehand input having attributes of the inking tool and functionality of the action tool without having to enter a particular action tool mode. Because the user is not required to enter a particular action tool mode, less memory and fewer processing resources are expended to author content in the productivity application, and the functionality of the computing device used to provide the productivity application is thereby expanded and improved.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 3B is an illustration showing the user providing inking input;

FIG. 4A is an illustration of another example user interface display generated by aspects of an ink-enabled application showing a selection of a shapes action tool as an alternate action tool functionality for an active action-enabled inking tool;

FIG. 5A is an illustration of another example user interface display generated by aspects of an ink-enabled application showing a selection of a revisions action tool subsequent to a selection of an inking tool;

FIG. 5B is an illustration showing a display of selectable functionalities to enable for the selected revisions action tool in response to a secondary selection of the action tool;

DETAILED DESCRIPTION

Figure 1:
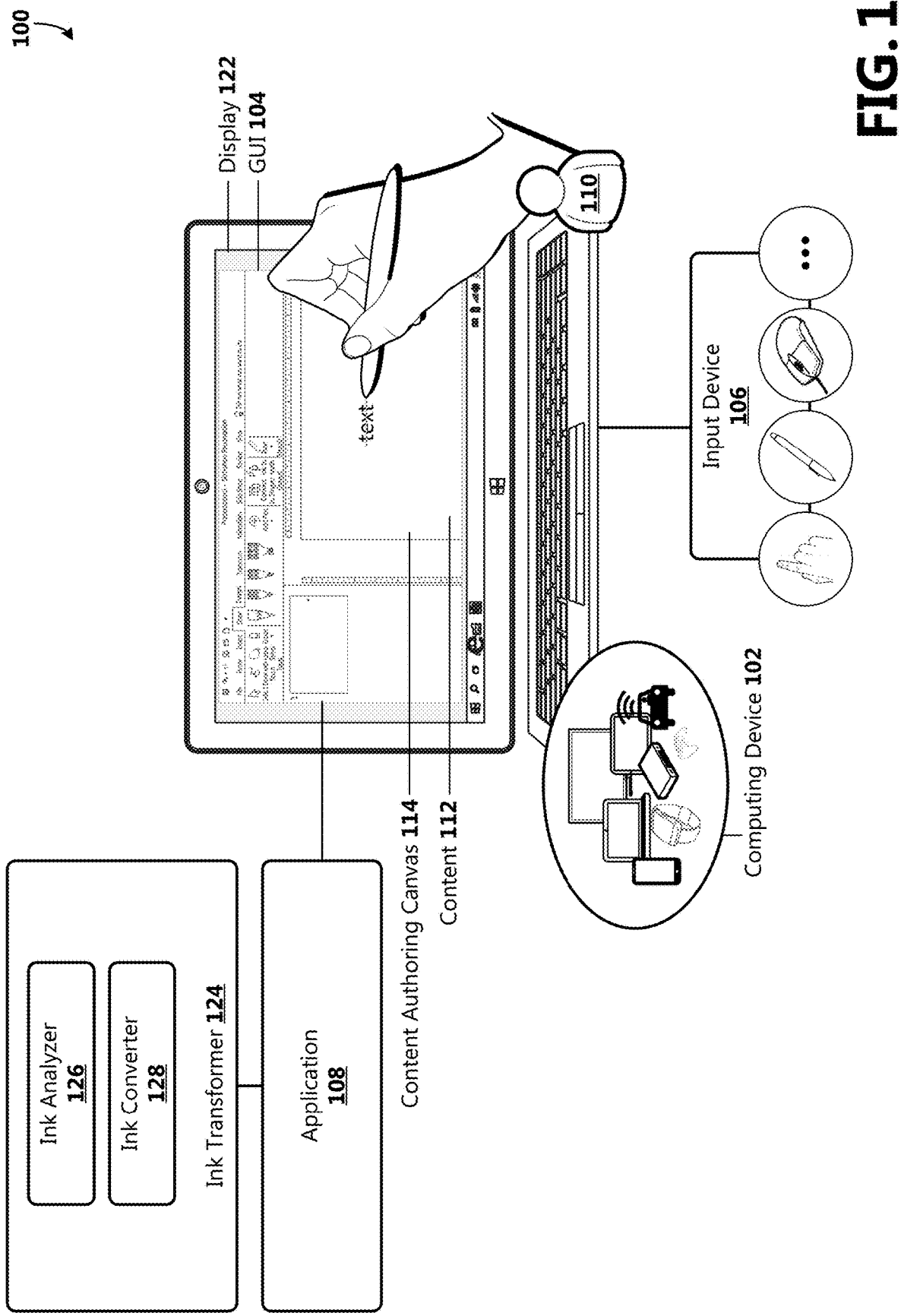
FIG. 1 is a simplified block diagram showing an example operating environment including components of a system for providing an action tool-integrated inking input tool.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for providing an action tool-integrated inking input tool for enabling an improved user experience using action tool functionality in an ink-enabled application. Users are enabled to efficiently select an integrated inking and action tool for providing freehand input having attributes of the inking tool and functionality of the action tool without having to enter a particular action tool mode.

With reference now to FIG. 1, a block diagram of an example operating environment 100 illustrating aspects of an example system for providing an action tool-integrated inking input tool is shown. The example operating environment 100 includes an electronic computing device 102. The computing device 102 illustrated in FIG. 1 is illustrated as a tablet computing device; however, as should be appreciated, the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications 108 for performing a variety of tasks. The hardware of these computing devices is discussed in greater detail in regard to FIGS. 7, 8A, 8B, and 9.

A user 110 may utilize an application 108 on the computing device 102 for a variety of tasks, which may include, for example, to write, calculate, draw, take and organize notes, organize, prepare presentations, send and receive electronic mail, make music, and the like. Examples of suitable applications 108 include, but are not limited to, word processing applications, spreadsheet applications, slide presentation applications, electronic mail applications, drawing applications, note-taking applications, web browser applications, and game applications. Applications 108 may include thick client applications 108, which are stored locally on the computing device 102, or may include thin client applications 108 (i.e., web applications) that reside on a remote server and accessible over a network. A thin client application 108 may be hosted in a browser-controlled environment or coded in a browser-supported language and reliant on a common web browser to render the application 108 executable on the computing device 102.

According to examples, the application 108 is a program that is launched and manipulated by an operating system, and manages content 112 within a content authoring canvas 114 and published on a display screen 122. Aspects of the application(s) 108 are operative to generate and provide a graphical user interface (GUI) 104 that allows a user 110 to interact with application functionality and electronic content. In various examples, the GUI 104 includes a toolbar, comprising various tools and settings related to authoring the content, and a content region display area, in which the content authoring canvas 114 of a document content file is displayed. According to an aspect, the application 108 is an ink-enabled application that is operative to receive freehand input collected from an input device 106, such as a tablet pen, a finger, a mouse, or other device, and to visually represent the input on an ink-enabled element, such as the content authoring canvas 114. The freehand input may be comprised of one or a plurality of digital strokes, and is referred to herein as "inking" input.

In examples, the application 108 receives input from the user, such as text input, drawing input, inking input, etc., via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. The user input results in content 112 being added to the content authoring canvas 114. Examples of a content authoring canvas include a page in a document content file, a spreadsheet in a spreadsheet content file, a slide in a presentation content file, a page in a notes content file, etc.

Aspects of the application 108 provide a tool for action tool-integrated inking input. Example interfaces associated with an action tool-integrated inking tool system are described throughout, including with respect to FIGS. 2A-5D. According to examples, the application 108 is operative to receive a selection of inking tool properties and an action tool functionality, set the an active action-enabled inking tool to have the selected inking tool properties and the functionality of the selected action tool for providing inking input and editing content 112 in the content authoring canvas 114.

The application 108 includes or is in communication with an ink transformer 124, operative to provide extended operations in the application 108 via inking input. In one example, the computing device 102 includes an ink transformation application programming interface (API), operative to enable the application 108 to employ the systems and methods of the present disclosure via stored instructions. According to an aspect, the ink transformer 124 comprises an ink analyzer 126 operative to analyze the received inking input for determining whether the inking input can be converted to text, a shape, a mathematical equation, or a revision of content 112 based on the selected action tool functionality for the active action-enabled inking tool. As should be appreciated, other action tool functionalities, such as conversion of inking input to a chemical equation or a music score are possible and are within the scope of the present disclosure. According to an aspect, the ink transformer 124 further comprises an ink converter 128 operative to convert the inking input to text, a shape, a mathematical equation, a chemical equation, a music score, or a revision of content 112 based on the selected action tool functionality for the active action-enabled inking tool. In some examples, inking input may be identified as an executable command, and the ink converter 128 may take an action based on the identified command. For example, the user 110 may strike through a word (content 112) displayed in a content authoring canvas 114 via inking input, and the ink analyzer 126 may analyze the strike-through and determine that the strike-through is an indication to delete the content 112 on which the strike-through is applied. Accordingly, the ink converter 128 may delete the word.

Figure 2A:
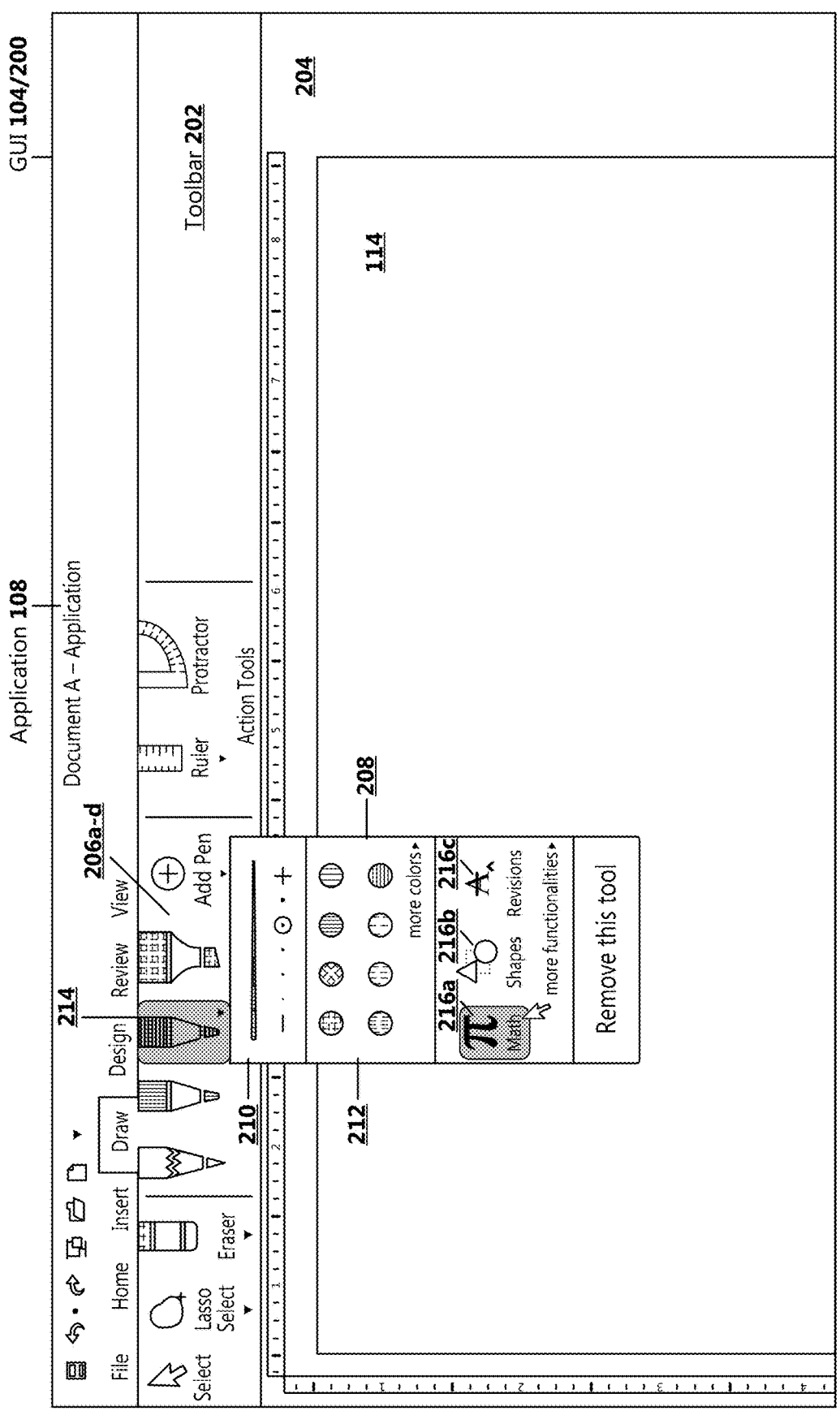
FIG. 2A is an illustration of an example user interface display generated by aspects of an ink-enabled application showing a selection of a math action tool functionality for a selected inking tool.

According to a first example and with reference to FIG. 2A, a plurality of inking tools 206a-d (collectively, 206) are provided, wherein each inking tool has a unique set of inking tool properties associated with it for providing inking input within the content authoring canvas 114. Non-limiting examples of inking tools 206 include pencils, pens, marker pens, highlighters, crayons, paint, and other drawing implements. In FIG. 2A, an example GUI 200 generated by an aspect of an application 108 and displayed by the user computing device 102 is shown. In this example, the GUI 200 includes a toolbar 202 and a content region display area 204. The content region display area 204 operates to display at least a portion of a content authoring canvas 114. In this example, the content authoring canvas 114 is a page. Other examples of content authoring canvases include spreadsheets and slides.

In some aspects, a user 110 can interact with and modify the content region that is displayed by adding, removing, repositioning, or otherwise modifying various content elements of the content region display area 204. For instance, content 112 in the content region display area 204 may be added or modified via user keystrokes on a keypad such as a physical keyboard or virtual (or soft) keyboard, movement of a mouse pointer or touchpad pointer, or via handwriting or hand-drawing input using a digital pen, stylus, or a finger. According to one aspect, freehand input (i.e., inking input) is enabled upon selection of an inking tool 206 displayed in the GUI 200.

According to some examples, the inking tools 206 are displayed in the toolbar 202. The toolbar 202 includes various tools and settings related to authoring the content. In some examples, the tools and settings in the toolbar 202 are organized in logical groups, which are collected together under tabs. The toolbar 202 may include fewer, additional, or different tools and settings than what is shown in the illustrated example. In some examples, the inking tools 206 are displayed outside of the toolbar 202, such as in a pane or displayed along a side of the GUI 200. According to examples, the plurality of inking tools 206 are displayed as icons, wherein each inking tool icon illustrates properties associated with a type of inking input the inking tool will provide in the content authoring canvas 114. Displaying inking tool icons that illustrate the user-selected properties for the corresponding inking tool 206 advantageously enables the user 110 to easily distinguish between the inking tools and to intuitively and efficiently select the drawing tool of choice for providing inking input within the content authoring canvas 114. A selection of an inking tool 206 sets the inking tool as the active action-enabled inking tool 214, and according to an aspect, the selected inking tool corresponding to the active action-enabled inking tool is highlighted. According to an aspect, the selected inking tool 206 is persistently displayed in the toolbar 202 and is highlighted when active to clearly inform the user 110 of the current or active action tool functionality.

Aspects of the application 108 provide for enabling the user 110 to make a secondary selection of an inking tool 206, wherein in response to a secondary selection of an inking tool, a customization menu 208 is displayed for allowing the user to modify various inking tool properties 210,212 to apply to the inking tool. For example, responsive to a right-click, a long-press, a hover, a selection of a split button command, or other secondary selection of an inking tool 206, the application 108 is operative to provide a customization menu 208 for selecting a particular color 212, stroke thickness 210, or ink effect to apply to the inking tool.

According to an aspect, the application 108 is further operative to provide options in the customization menu 208 for allowing the user to select an action tool functionality 216a-c (collectively, 216) to assign to the selected inking tool 206. For example, the customization menu 208 includes a math action tool functionality 216a, which when selected, applies math action tool functionality to the selected inking tool 206c that causes inking input provided via the selected inking tool to be analyzed and converted into a mathematical equation. As another example, the customization menu 208 includes a shapes action tool functionality 216b, which when selected, applies shapes action tool functionality to the selected inking tool 206c that causes inking input provided via the selected inking tool to be analyzed and converted into a shape. As another example, the customization menu 208 includes a revisions action tool functionality 216c, which when selected, applies revisions action tool functionality to the selected inking tool 206c that causes inking input provided via the selected inking tool to be analyzed and content 112 within the content authoring canvas 114 to be revised based on the inking input. As should be appreciated, other action tool functionalities 216 are possible and are within the scope of the present disclosure. For example, the customization menu 208 may include a chemistry action tool functionality, which when selected, applies chemistry action tool functionality to the selected inking tool that causes inking input provided via the selected inking tool to be analyzed and converted into a chemical equation. As another example, the customization menu 208 may include a music action tool functionality, which when selected, applies music action tool functionality to the selected inking tool that causes inking input provided via the selected inking tool to be analyzed and converted into a music score or musical notations, such as notes, rests, accidentals, ties, grace notes, staffs, clefs, key signatures, time signatures, etc.

Figure 2B:
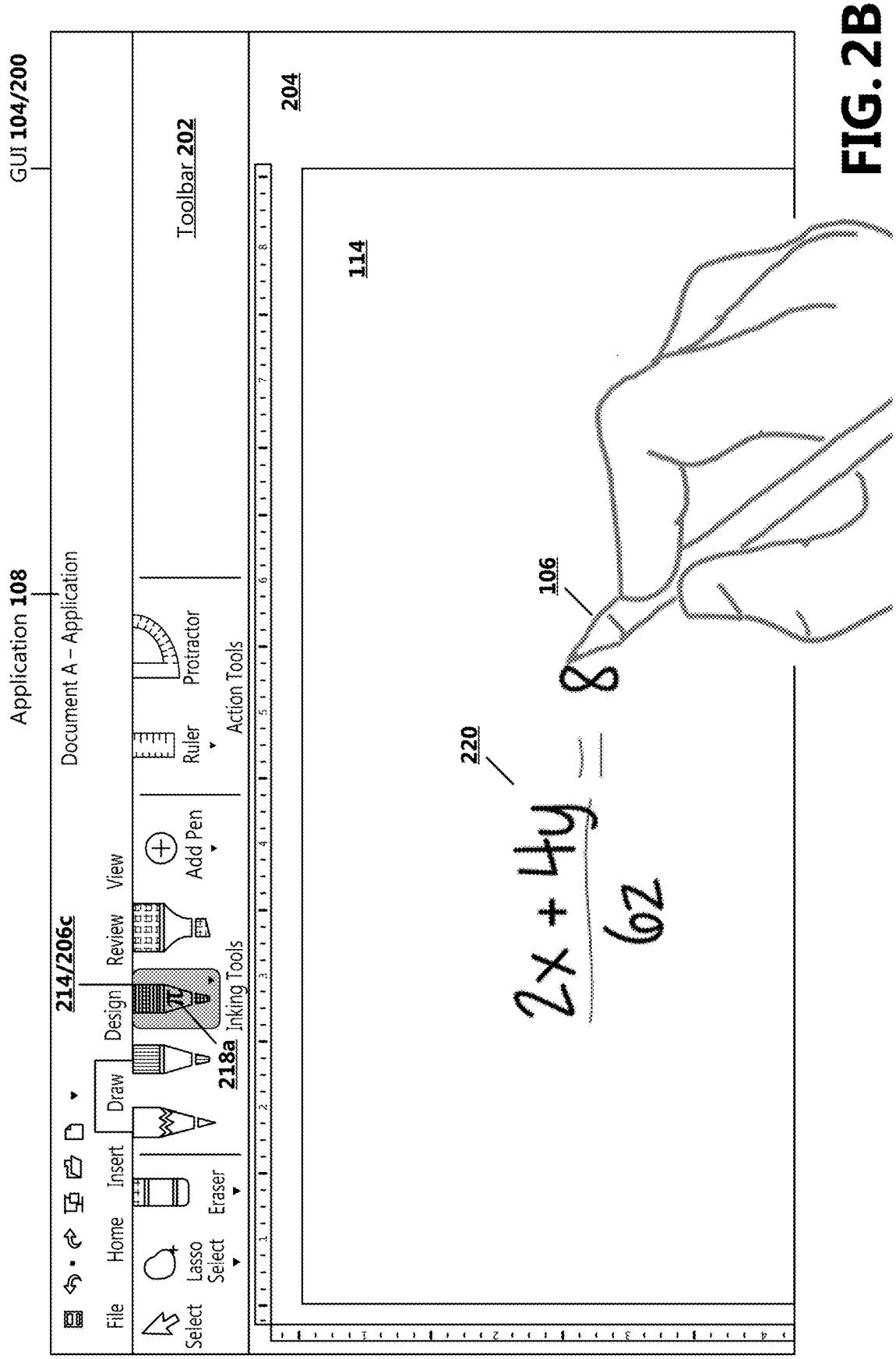
FIG. 2B is an illustration showing the selected inking tool updated with the selected action tool functionality and a user providing inking input.

With reference now to FIG. 2B, responsive to a selection of an action tool 216, the selected inking tool 206c is updated to illustrate the selected action tool functionality, such as via a display of an action tool functionality icon 218. For example and as illustrated, responsive to a selection of the math action tool functionality 216a, math action tool functionality is applied to the active action-enabled inking tool, and a math icon 218a is displayed on the selected inking tool 206c, providing a clear indication to the user 110 that the active action-enabled inking tool has the inking tool properties corresponding to the illustrated inking tool icon and the action tool functionalities corresponding to the illustrated action tool functionality icon 218. Referring still to FIG. 2B, the user 110 is shown providing inking input 220 in the content authoring canvas 114. In the illustrated example, the inking input 220 is a mathematical equation.

Figure 2C:
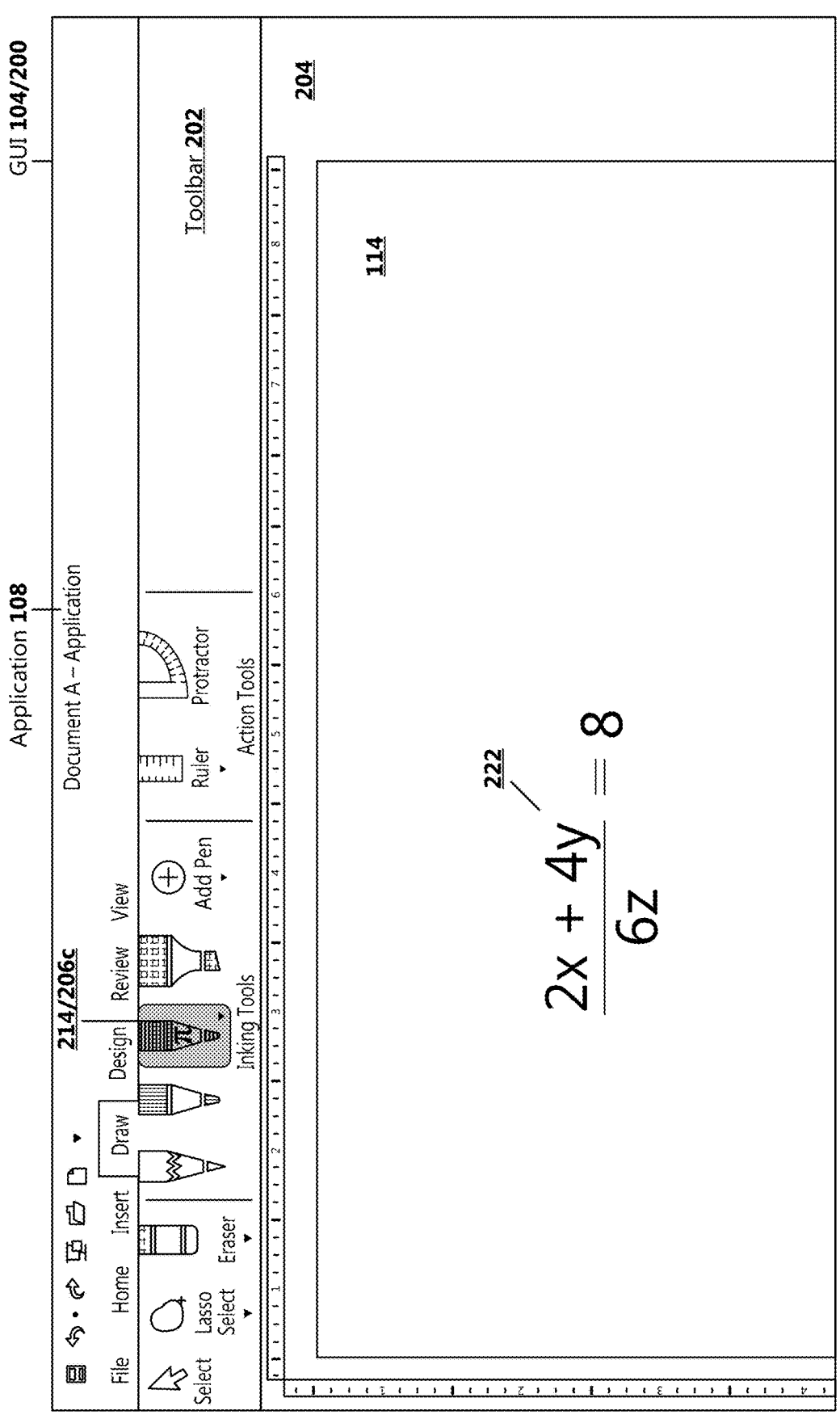
FIG. 2C is an illustration showing a conversion of the inking input to a mathematical equation.

With reference now to FIG. 2C, responsive to receiving the inking input 220, the ink transformer 124 analyzes the inking input based on the selected math action tool functionality 216a, and converts the inking input to a mathematical equation 222. For example, the inking input 220 comprised of freehand strokes is converted to alpha-numeric text and mathematical symbols in the form of an equation.

Figure 3A:
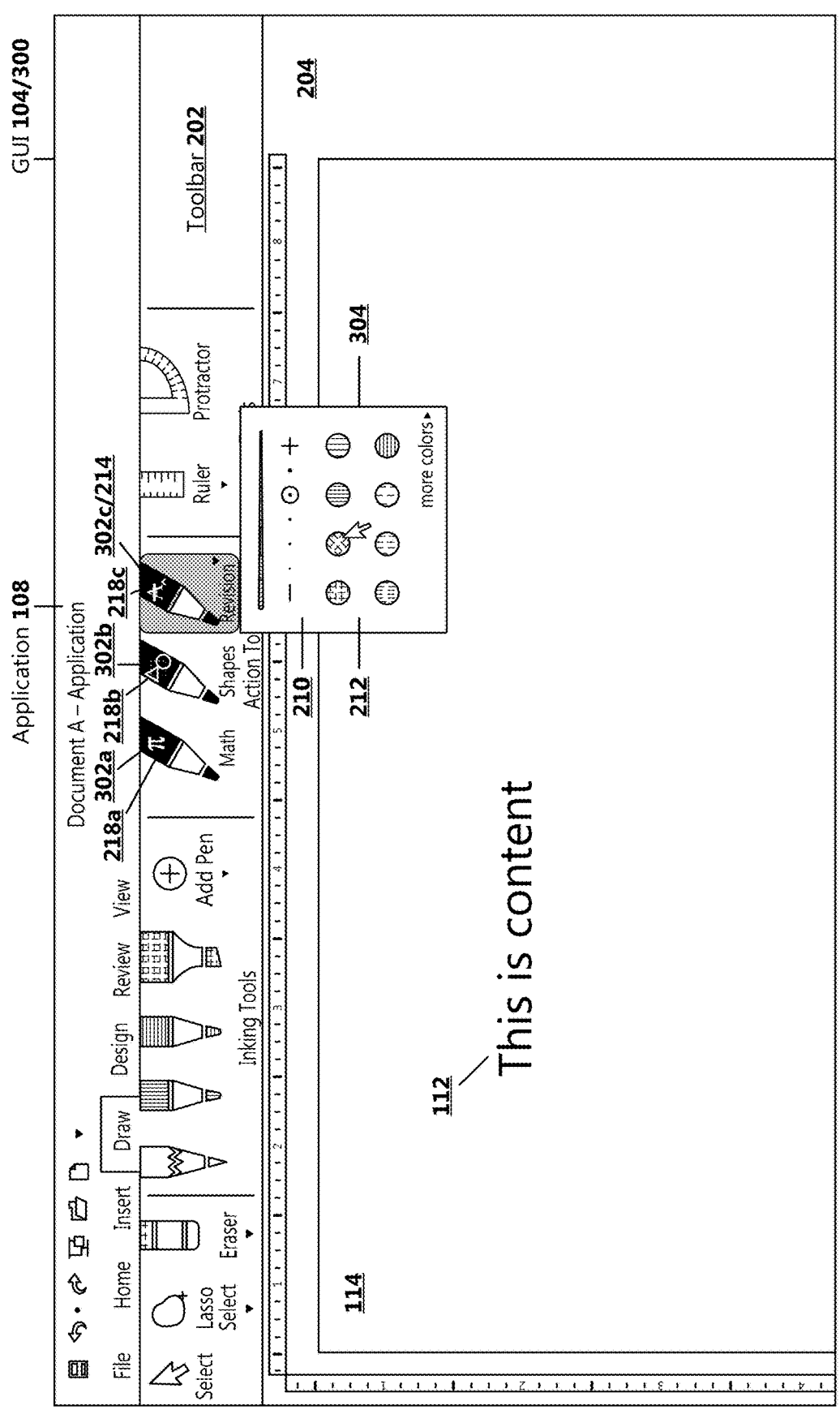
FIG. 3A is an illustration of another example user interface display generated by aspects of an ink-enabled application showing a selection of inking tool properties for a selected revisions action tool.

With reference now to FIG. 3A, another example GUI 300 generated by an aspect of an application 108 and displayed by the user computing device 102 is shown. In this example, the GUI 300 includes a toolbar 202 and a content region display area 204, wherein the toolbar includes a plurality of action tools 302*a-c* (collectively, 302). For example, the plurality of action tools 302*a-c* includes a math action tool 302*a* having a functionality for converting inking input 220 to a mathematical equation, a shapes action tool 302*b* having a functionality for converting inking input to a shape, and a revisions action tool 302*c* having a functionality for revising content based on inking input. As should be appreciated, other action tools 302, such as a chemistry action tool and a music action tool, are possible and are within the scope of the present disclosure. As illustrated, each action tool 302 illustrates its corresponding functionality. For example, the math action tool 302*a* comprises an icon 218*a* including a mathematical symbol, the shapes action tool 302*b* comprises an icon 218*b* including a geometric shape, and the revisions action tool 302*c* comprises an icon 218*c* including at least one proofreading symbol. In other examples, a chemistry action tool comprises an icon 218 including a chemical symbol or icon, such as a beaker or an element abbreviation, and a music action tool comprises an icon including a music note or other musical symbol.

As illustrated in FIG. 3A, the user 110 has provided a secondary selection of the revisions action tool 302*c*. For example, the user 110 may perform a right-click, a long-press, a hover, a selection of a split button command, or other secondary selection of an action tool 302. Responsive to the secondary selection, a customization menu 304 is displayed for allowing the user to select various inking tool properties (e.g., color 212, stroke thickness 210, or ink effect) to apply to the selected action tool 302*c*. According to an example, if an inking tool property 210,212 is not selected, default inking tool properties may be applied to the selected action tool.

According to aspects and with reference now to FIG. 3B, responsive to a primary selection of an action tool 302 or a selection of inking tool properties 210,212 subsequent to a secondary selection of an action tool, the selected action tool is set as the active action-enabled inking tool 214. As illustrated, the selected action tool 302*c* is highlighted in the toolbar 202 to inform the user 110 of the current or active action tool functionality. In some examples, the selected action tool 302*c* is updated to illustrate selected inking tool properties 210,212. For example, the color 212 of the selected action tool 302*c* may be updated as a selected inking tool color. Also illustrated in FIG. 3B, inking input 220 is being provided by the user 110 via an input device 106. In this example, the user 110 is providing ink proofreading annotations including an insertion mark pointing to an inked word "ink" and a strike-through over the text "content" (content 112) displayed in the content authoring canvas 114.

Figure 3C:
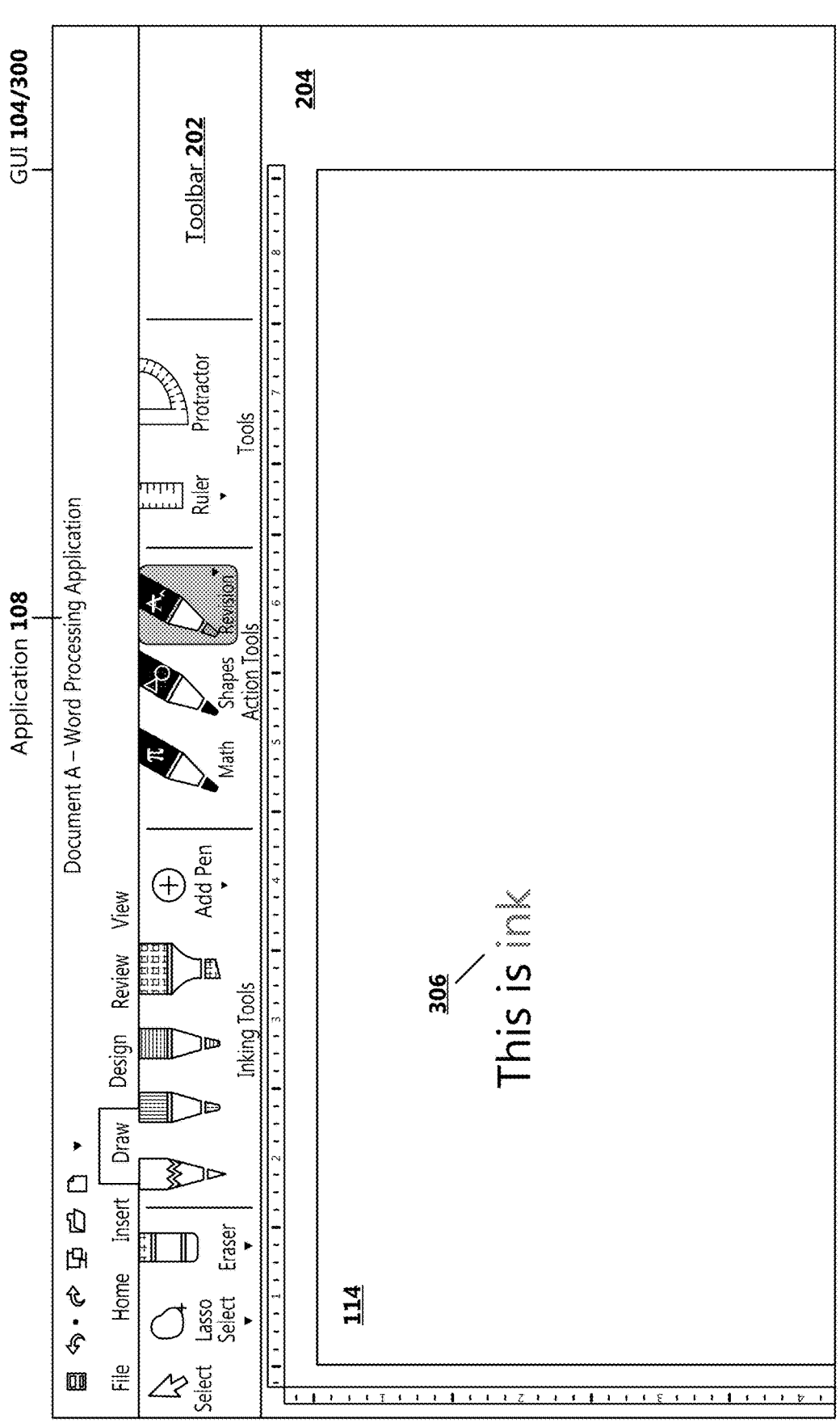
FIG. 3C is an illustration showing revision of content based on the inking input.

With reference now to FIG. 3C, responsive to receiving the inking input 220, the ink transformer 124 analyzes the inking input based on the selected revisions action tool 302*c*, and converts the inking input to revisions 306 to the content 112. For example, the proofreading annotation inking input 220 is identified as a command to revise the content 112 based on the inking input. Accordingly, the text "content" is deleted, and the inked work "ink" is added to the content 112 as text, and the selected inking tool properties 210,212 are applied to the text.

With reference now to FIG. 4A, another example GUI 400 generated by an aspect of an application 108 and displayed by the user computing device 102 is shown. In this example, the GUI 400 includes a toolbar 202 and a content region display area 204, wherein the toolbar includes a single action tool 402. According to an aspect and as illustrated, the single action tool 402 is operative to receive a secondary selection (e.g., right-click, a long-press, a hover, a selection of a split button command, or other secondary selection method). In response to a secondary selection, a customization menu 404 is displayed for allowing the user to select an action tool functionality 216*a-c* (e.g., math action tool functionality 216*a*, shapes action tool functionality 216*b*, revisions action tool functionality 216*c*, chemistry action tool functionality 216*d*, or music action tool functionality 216*e*) and inking tool properties (e.g., color 212, stroke thickness 210, or ink effect) to apply to the single action tool 402. In the illustrated example, the user 110 is shown selecting the shapes action tool functionality 216*b*. According to an example, if an inking tool property 210,212 is not selected, default inking tool properties may be applied to the selected action tool. Further, if an action tool functionality 216 is not selected, a last-used action tool functionality may be applied to the action tool. According to one example, if an action tool functionality 216 is not selected, the ink transformer 124 is operative to analyze inking input 120 and determine an appropriate edit based on the received inking input and contextual information.

Figure 4B:
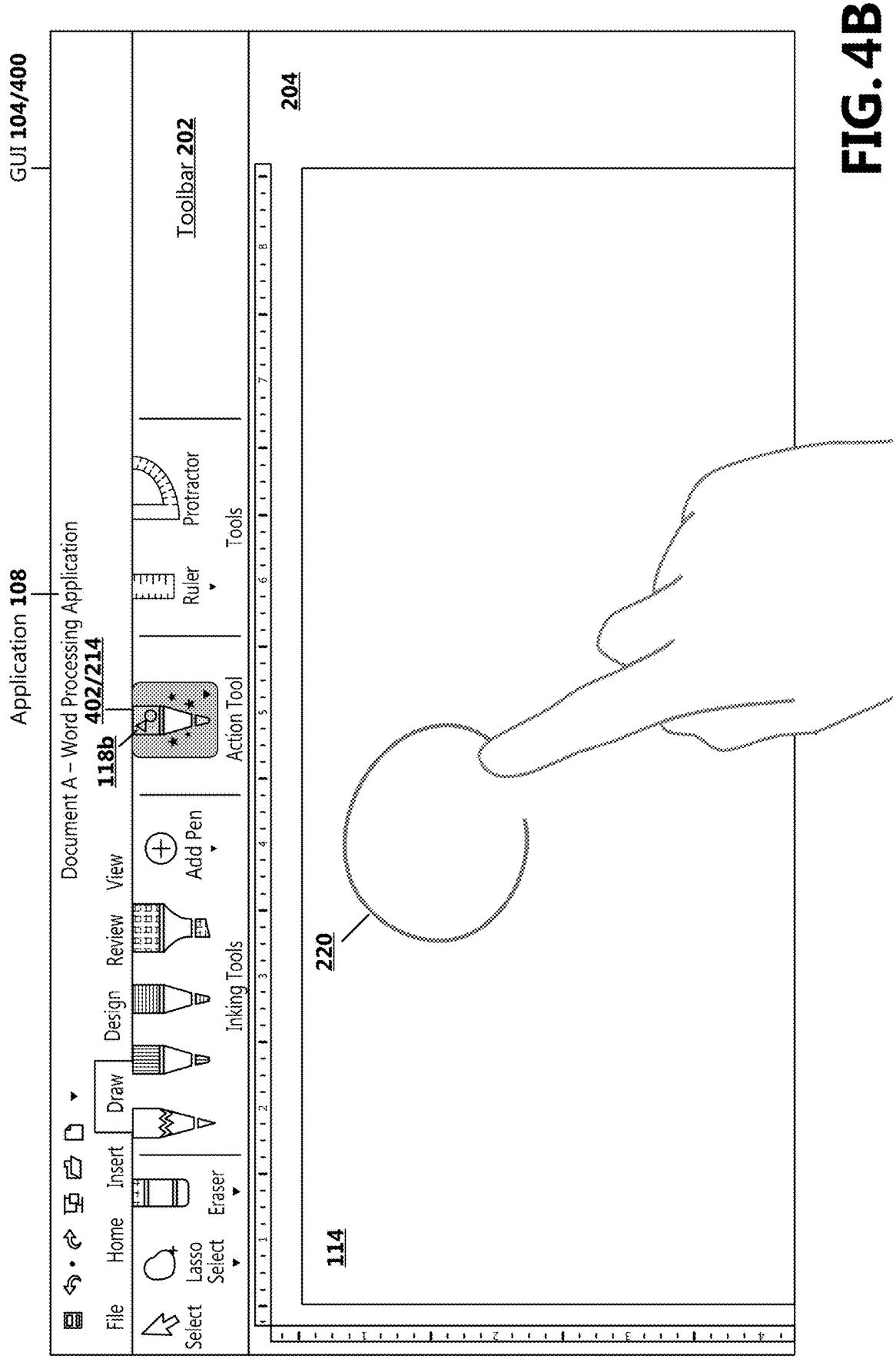
FIG. 4B is an illustration showing the action tool updated to illustrate the shapes action tool functionality and the user providing inking input.

According to aspects and with reference now to FIG. 4B, responsive to a primary selection of the single action tool 402 or a selection of an action tool functionality 216 and/or a selection of inking tool properties 210,212 subsequent to a secondary selection of the single action tool, the single action tool is set as the active action-enabled inking tool 214. Further the selected action tool functionality 216 and the selected inking tool properties 210,212 are applied to the single action tool 402. According to an aspect, the single action tool 402 is highlighted in the toolbar 202, and is updated to illustrate the selected action tool functionality 216*b* and selected inking tool properties 210,212. For example, an icon 218*b* including a geometric shape may be applied to the single action tool 402, and the selected inking tool color 212 may be applied to the single action tool. According to an aspect, the selected inking tool functionality 216*b* is persistently displayed in the toolbar 202 to clearly inform the user 110 of the current or active action tool functionality. Also illustrated in FIG. 4B, inking input 220 is being provided by the user 110. In this example, the user 110 is drawing an ink shape.

Figure 4C:
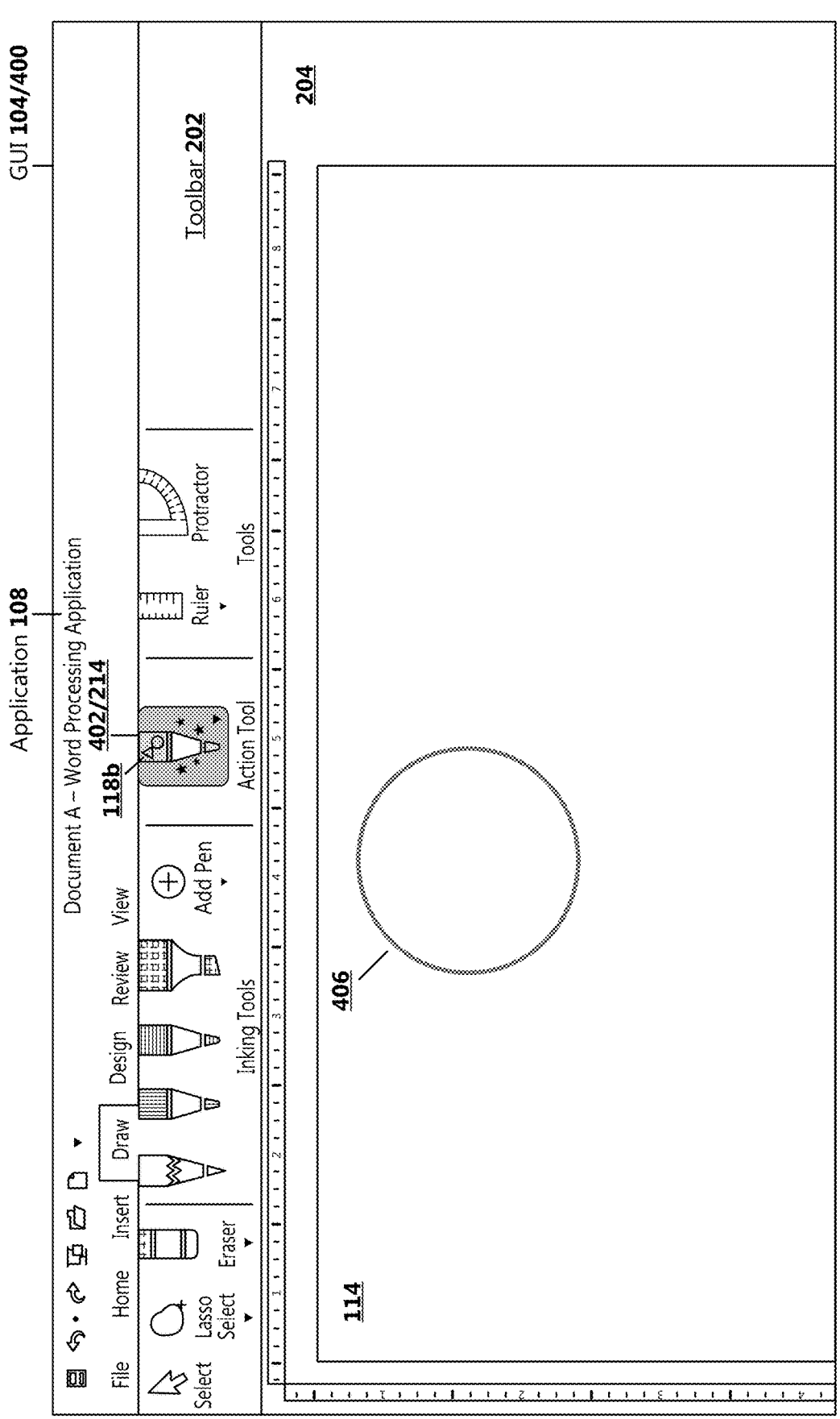
FIG. 4C is an illustration showing a conversion of the inking input to a shape.

With reference now to FIG. 4C, responsive to receiving the inking input 220, the ink transformer 124 analyzes the inking input based on the selected shapes action tool functionality 218*b*, and converts the inking input to a shape 406. For example, the ink shape inking input 220 is identified as a circle, and is converted to a circle shape 406.

With reference now to FIG. 5A, another example GUI 500 generated by an aspect of an application 108 and displayed by the user computing device 102 is shown. In this example, the GUI 500 includes a toolbar 202 and a content region display area 204, wherein the toolbar includes a plurality of inking tools 206 and a plurality of action tools 502*a-c*, wherein each action tool has a particular action tool functionality 216*a-c* associated with it. According to an aspect, the user 110 is enabled to select an inking tool 206 and an action tool 502 for applying the inking tool properties associated with the selected inking tool and the action tool functionalities associated with the selected action tool to an active action-enabled inking tool. As illustrated in FIG. 5A, the user 110 is shown selecting a pen inking tool 206*b* having particular inking tool properties and the revisions action tool 502*c* having corresponding revisions action tool functionality 216*c*.

According to an aspect and as illustrated in FIG. 5B, responsive to a secondary selection of an inking tool 206 or an action tool 502, the GUI 104/500 is updated to display a customization menu 504 allowing the user 110 to select one or more specific properties or functionalities for the selection. In the illustrated example, a plurality of revision functionalities 506a-n (collectively, 506) are displayed in the customization menu 504 from which the user 110 is enabled to select for applying to the active action-enabled inking tool 214.

Figure 5D:
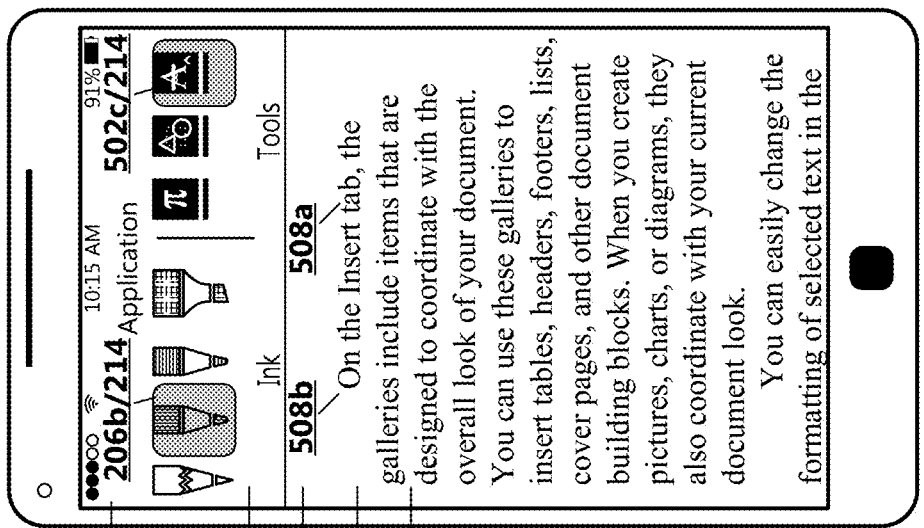
FIG. 5D is an illustration showing revision of content based on the inking input.
Figure 5C:
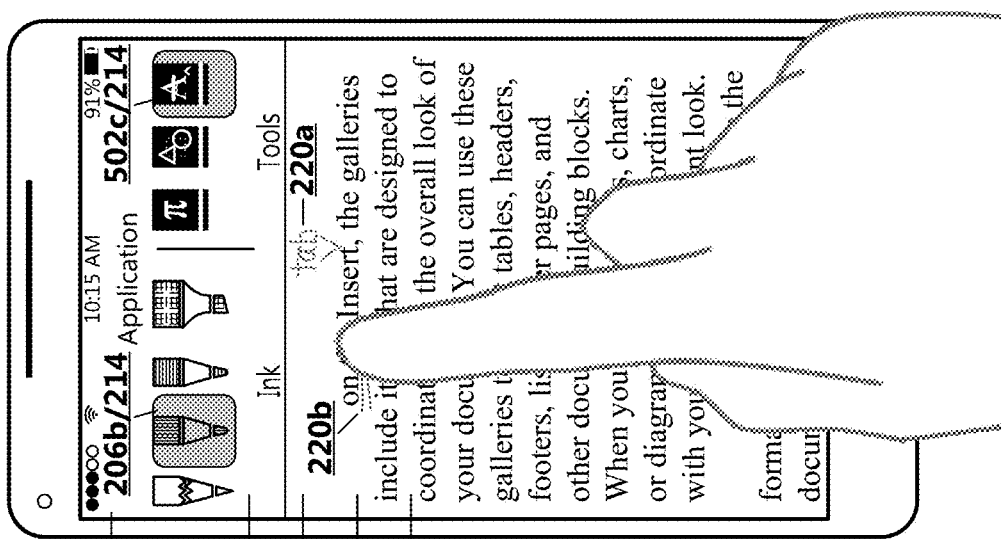
FIG. 5C is an illustration showing the selected inking tool and the selected action tool highlighted and the user providing inking input.

With reference now to FIG. 5C, responsive to a primary selection of an inking tool 206 and an action tool 502 or after selection of inking tool properties 210,212 or action tool functionalities 506 in a customization menu 504, the inking tool properties associated with the selected inking tool and the action tool functionalities associated with the selected action tool are applied to the active action-enabled inking tool 214. As illustrated, the selected inking tool 206b and the selected action tool 502c are highlighted in the toolbar 202. According to an aspect, the selected inking tool 206b and the selected action tool 502c are persistently displayed in the toolbar 202 and are highlighted when active to clearly inform the user 110 of the current or active action tool functionalities. Also illustrated in FIG. 5C, inking input 220a,b is being provided by the user 110. In this example, the user 110 is providing proofreading annotations. For example, a first inking input 220a includes an insertion mark pointing to an inked word "tab," and a second inking input 220b includes a double-underline below a first letter of the text "on" (content 112) displayed in the content authoring canvas 114.

With reference now to FIG. 5D, responsive to receiving the inking input 220a,b, the ink transformer 124 analyzes the inking input based on the selected revisions action tool 502c, and converts the inking input to revisions 508a,b to the content 112. For example, the proofreading annotation inking inputs 220a,b are identified as commands to revise the content 112 based on the inking input. Accordingly, the "o" in the text "on" is capitalized, the inked work "tab" is added to the content 112 as text, and the inking tool properties 210,212 associated with the selected inking tool 206b are applied to the text.

Figure 6A:
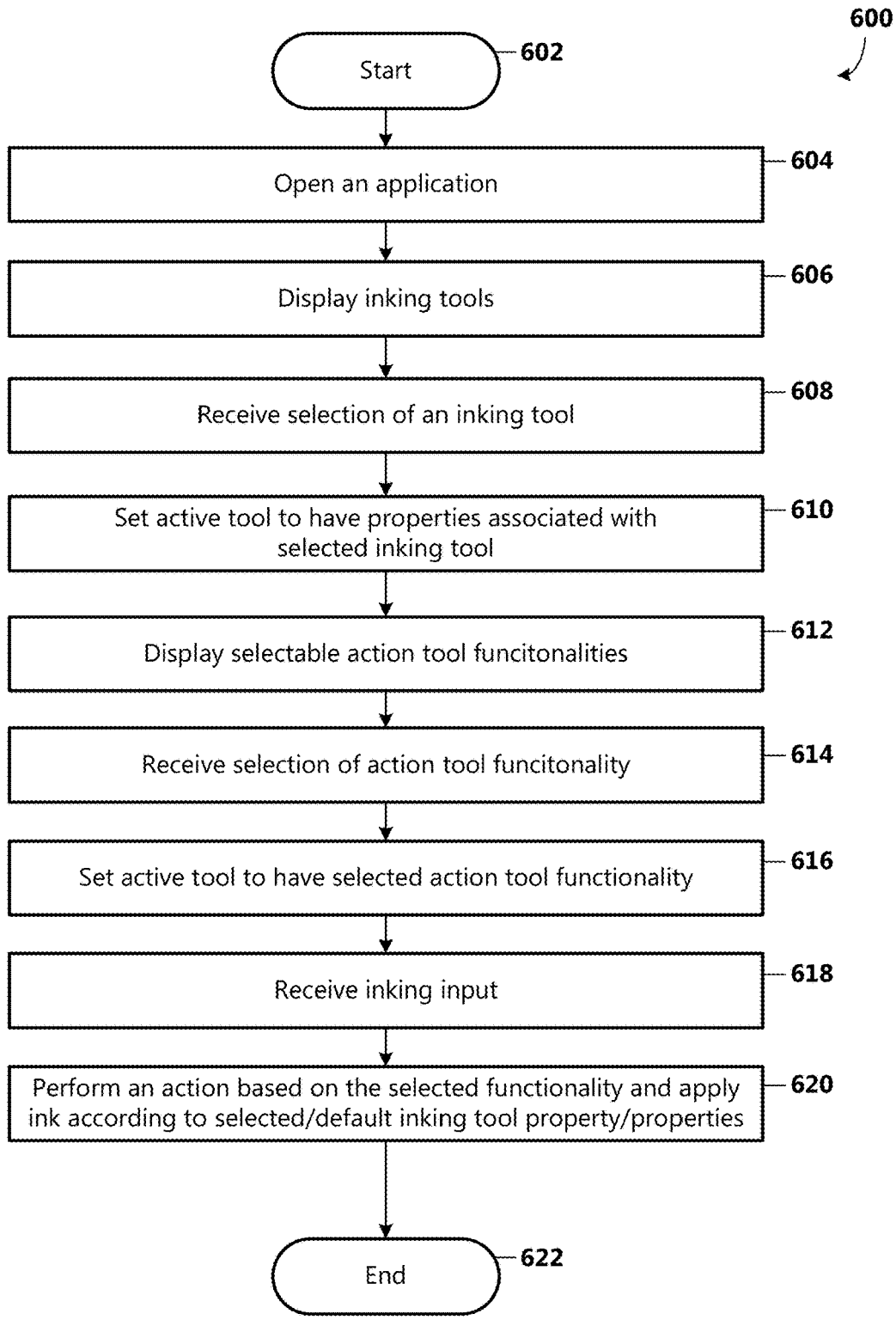
FIG. 6A is a flow chart showing general stages involved in an example method for providing an action tool-integrated inking input tool according to a first example.

Having described an operating environment and various user interface display examples with respect to FIGS. 1-5D, FIGS. 6A-6D are flow charts showing general stages involved in example methods 600, 626, 654, 680 for providing an action tool-integrated inking input tool. With reference now to FIG. 6A, the example method 600 corresponds with the user interface display examples illustrated in FIGS. 2A-C. The example method 600 starts at OPERATION 602, and proceeds to OPERATION 604, where an ink-enabled application 108 is opened.

At OPERATION 606, a plurality of inking tools 206 are displayed in the GUI 104/200 of the application. For example each of the plurality of inking tools 206 comprises a set of configurable inking tool properties. The method 600 proceeds to OPERATION 608, where a selection of an inking tool 206 is received. In one example, the selection is a secondary selection of the inking tool 206, such as via a right-click, a long-press, a hover, a selection of a split button command, or other secondary selection method.

The method 600 proceeds to OPERATION 610, where the inking tool properties 210,212 associated with the selected inking tool 206 are applied to an active action-enabled inking tool 214. At OPERATION 612, a plurality of selectable action tool functionalities 216 is displayed in a customization menu 208. For example, the plurality of selectable action tool functionalities 216 may include one or a combination of the following: a math action tool functionality 216a, which when selected, applies math action tool functionality to the selected inking tool 206c that causes inking input provided via the selected inking tool to be analyzed and converted into a mathematical equation; a shapes action tool functionality 216b, which when selected, applies shapes action tool functionality to the selected inking tool 206c that causes inking input provided via the selected inking tool to be analyzed and converted into a shape; a revisions action tool functionality 216c, which when selected, applies revisions action tool functionality to the selected inking tool 206c that causes inking input provided via the selected inking tool to be analyzed and content 112 within the content authoring canvas 114 to be revised based on the inking input; a chemistry action tool functionality, which when selected, applies chemistry action tool functionality to the selected inking tool that causes inking input provided via the selected inking tool to be analyzed and converted into a chemical equation; and a music action tool functionality, which when selected, applies music action tool functionality to the selected inking tool that causes inking input provided via the selected inking tool to be analyzed and converted into music notes or a music score.

The method 600 proceeds to OPERATION 614, where an action tool functionality 216 is selected. Responsive to the selection, the method 600 proceeds to OPERATION 616, where the selected action tool functionality 216 is applied to the active action-enabled inking tool 214. According to an example, the selected inking tool 206 is updated to illustrate the selected action tool functionality 216. For example, when a math action tool functionality 216a is selected, the selected inking tool 206 is updated to include an icon 218a including a mathematical symbol. As another example, when a shapes action tool functionality 216b is selected, the selected inking tool 206 is updated to include an icon 218b including a geometric shape. As another example when a revisions action tool functionality 216c is selected, the selected inking tool 206 is updated to include an icon 218c including at least one proofreading symbol. According to another example, when a chemistry action tool functionality is selected, the selected inking tool 206 is updated to include an icon 218 including a chemistry symbol. As another example, when a music action tool functionality is selected, the selected inking tool 206 is updated to include an icon 218 including a musical symbol.

At OPERATION 618, inking input 220 is received in the content authoring canvas 114. At OPERATION 620, an action is performed based on the selected action tool functionality 216 and displayed according to the inking tool properties associated with the selecting inking tool 206. For example, the inking input is analyzed and converted into a mathematical equation, a shape, a chemistry equation, or a music score, or content 112 within the content authoring canvas 114 is revised based on the inking input. The method 600 ends at OPERATION 622.

Figure 6B:
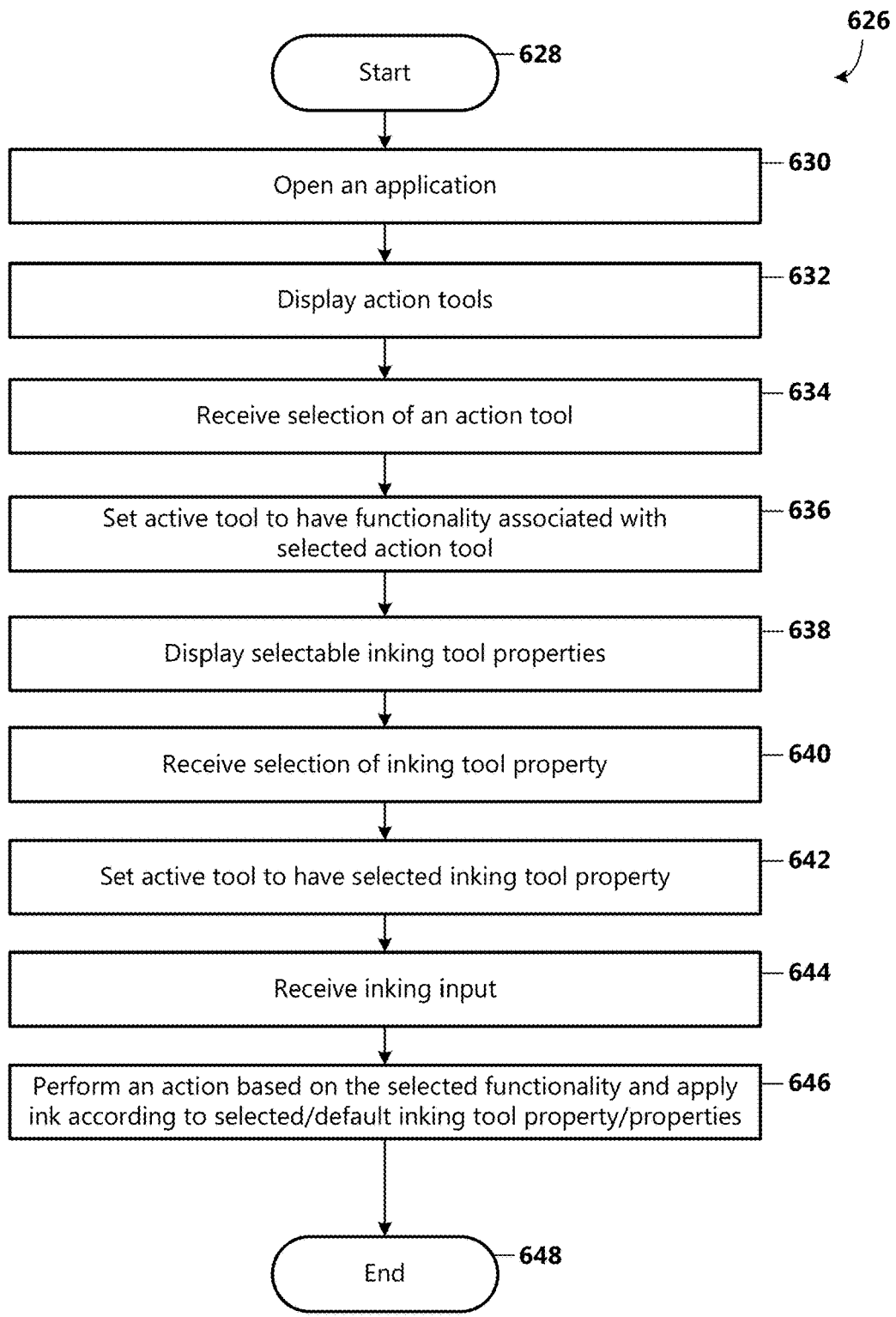
FIG. 6B is a flow chart showing general stages involved in an example method for providing an action tool-integrated inking input tool according to a second example.

With reference now to FIG. 6B, the example method 626 corresponds with the user interface display examples illustrated in FIGS. 3A-C. The example method 626 starts at OPERATION 628, and proceeds to OPERATION 630, where an ink-enabled application 108 is opened.

The method 626 proceeds to OPERATION 632, where a plurality of action tools 302a-c (collectively, 302) is displayed. For example, the plurality of action tools 302a-c includes a math action tool 302a having a functionality for converting inking input 220 to a mathematical equation, a shapes action tool 302b having a functionality for converting inking input to a shape, and a revisions action tool 302c having a functionality for revising content based on inking input. Other action tools 302 may be displayed, such as a chemistry action tool or a music action tool.

The method 626 proceeds to OPERATION 634, where a selection of an action tool 302 is received. In one example, the selection is a secondary selection of the action tool 302, such as via a right-click, a long-press, a hover, a selection of a split button command, or other secondary selection method. The method 626 proceeds to OPERATION 636, where the action tool functionality 216 associated with the selected action tool 302 is applied to the active action-enabled inking tool 214.

The method 626 proceeds to OPERATION 638, where inking tool properties 210,212 are displayed for allowing the user 110 to select a particular color 212, stroke thickness 210, or ink effect to apply to the active action-enabled inking tool 214. At OPERATION 640, a selection of one or more inking tool properties is received, and at OPERATION 642, the selected inking tool properties are applied to the active action-enabled inking tool 214. According to examples, the selected action tool 302 is updated to display the selected inking tool properties. Further, the selected action tool 302 is persistently highlighted to clearly inform the user 110 of the current or active action tool functionalities.

The method 626 proceeds to OPERATION 644, where inking input 220 is received in the content authoring canvas 114. At OPERATION 646, an action is performed based on the action tool functionality 216 associated with the selected action tool 302 and displayed according to the inking tool properties associated with the selecting inking tool 206. For example, the inking input is analyzed and converted into a mathematical equation, a shape, a chemistry equation, or a music score, or content 112 within the content authoring canvas 114 is revised based on the inking input. The method 626 ends at OPERATION 648.

Figure 6C:
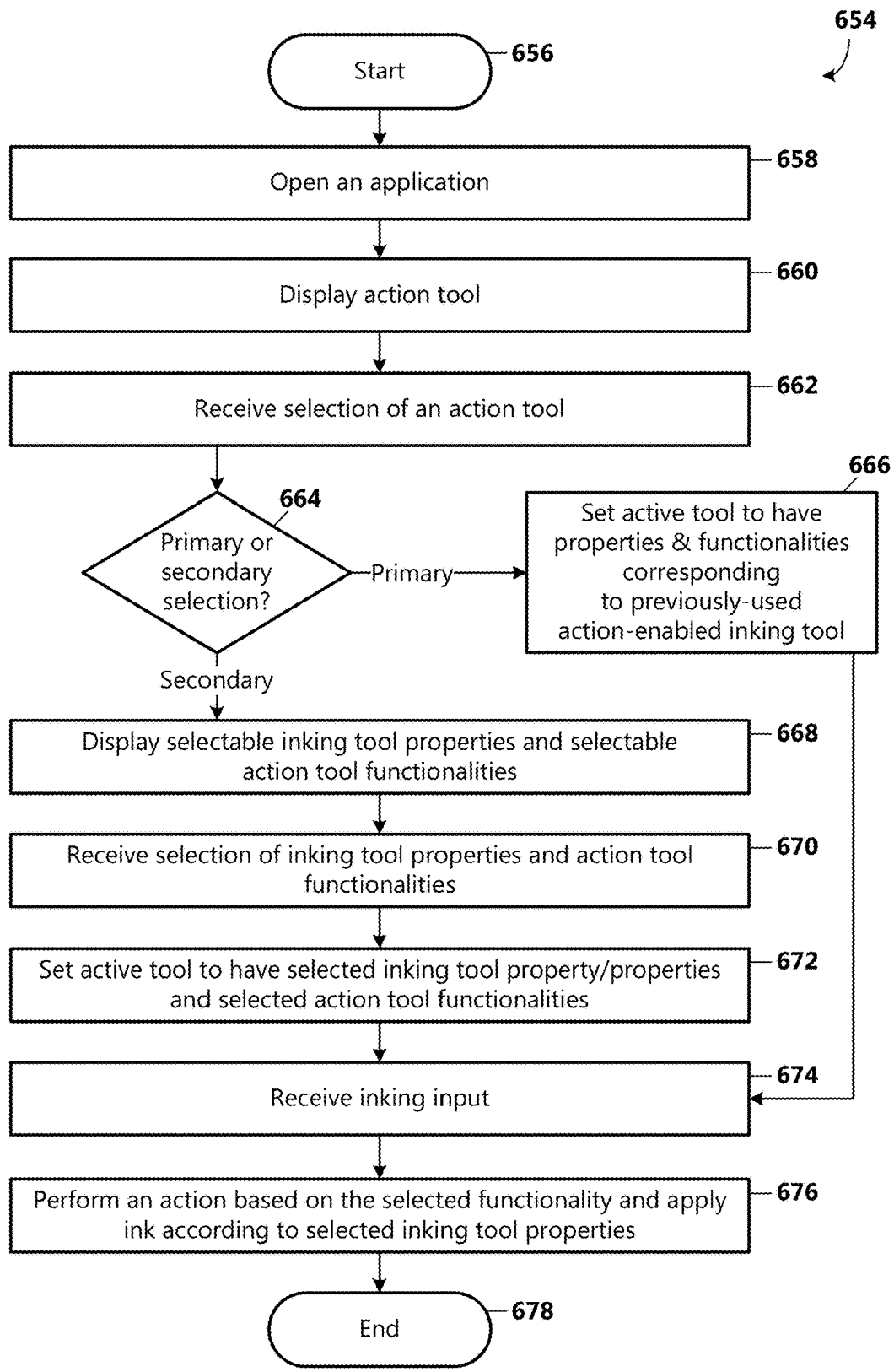
FIG. 6C is a flow chart showing general stages involved in an example method for providing an action tool-integrated inking input tool according to a third example.

With reference now to FIG. 6C, the example method 654 corresponds with the user interface display examples illustrated in FIGS. 4A-C. The example method 654 starts at OPERATION 656, and proceeds to OPERATION 658, where an ink-enabled application 108 is opened.

The method 654 proceeds to OPERATION 660, where a single action tool 402 is displayed. At OPERATION 662, a selection of the single action tool 402 is received. The method 654 proceeds to DECISION OPERATION 664, where a determination is made as to whether the selection is a primary selection or a secondary selection.

When a determination is made that the selection is a primary selection, the method 654 proceeds to OPERATION 666, where the inking tool properties 210,212 and the action tool functionalities 216 corresponding to a previously-used action-enabled inking tool are applied to an active action-enabled inking tool 214.

When a determination is made that the selection is a secondary selection, the method 654 proceeds to OPERATION 668, where selectable inking tool properties 210,212 and selectable action tool functionalities 216 are displayed in a customization menu 208.

The method 654 proceeds to OPERATION 670, where a selection of inking tool properties 210,212 and action tool functionalities 216 is received, and at OPERATION 672, the selected inking tool properties 210,212 and action tool functionalities 216 are applied to the active action-enabled inking tool 214. According to an example, the selected inking tool 206 is updated to illustrate the selected inking tool properties 210,212 and action tool functionality 216.

The method 654 proceeds to OPERATION 674, where inking input 220 is received in the content authoring canvas 114. At OPERATION 676, an action is performed based on the selected action tool functionality 216 and displayed according to the inking tool properties associated with the selecting inking tool 206. For example, the inking input is analyzed and converted into a mathematical equation, a shape, a chemistry equation, or a music score, or content 112 within the content authoring canvas 114 is revised based on the inking input. The method 654 ends at OPERATION 678.

Figure 6D:
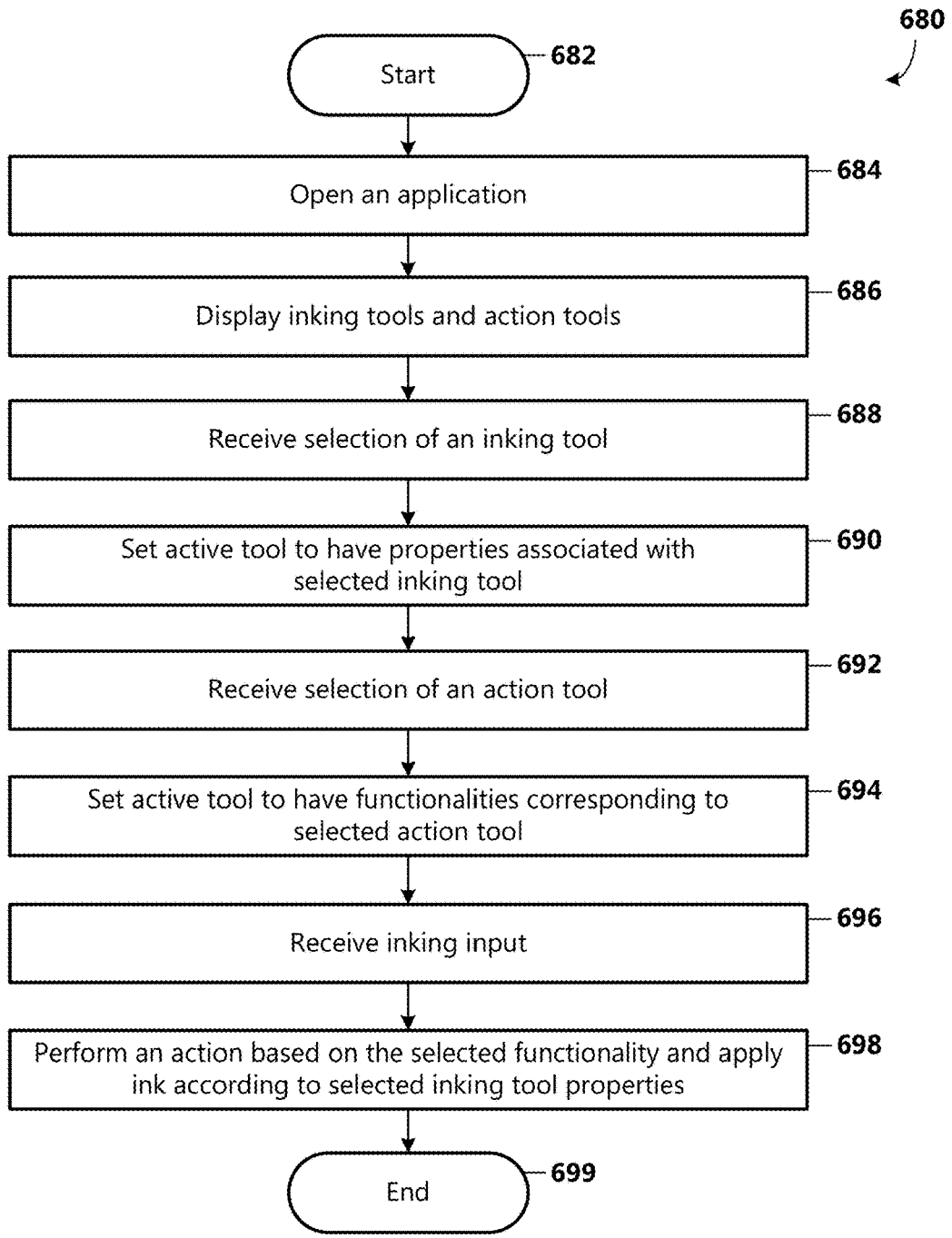
FIG. 6D is a flow chart showing general stages involved in an example method for providing an action tool-integrated inking input tool according to a fourth example.

With reference now to FIG. 6D, the example method 680 corresponds with the user interface display examples illustrated in FIGS. 5A-D. The example method 680 starts at OPERATION 682, and proceeds to OPERATION 684, where an ink-enabled application 108 is opened.

The method 680 proceeds to OPERATION 686, where a plurality of inking tools 206 and a plurality of action tools 502a-c are displayed. For example, each inking tool 206 has particular configurable inking tool properties associated with it, and each action tool has a particular action tool functionality 216a-c associated with it.

The method 680 proceeds to OPERATION 688, where a selection of an inking tool 206 is made, and at OPERATION 690, inking tool properties associated with the selected inking tool are applied to an active action-enabled inking tool. Further, the selected inking tool 206 is persistently highlighted to inform the user 110 of the current or active inking tool properties 210,212.

The method 680 proceeds to OPERATION 692, where a selection of an action tool 502 is received, and at OPERATION 694, the action tool functionality associated with the selected action tool is applied to the active action-enabled inking tool. Further, the selected action tool 502 is persistently highlighted to inform the user 110 of the current or active action tool functionality.

The method 680 proceeds to OPERATION 696, where inking input 220 is received in the content authoring canvas 114. At OPERATION 698, an action is performed based on the action tool functionality 216 associated with the selected action tool 502 and displayed according to the inking tool properties associated with the selecting inking tool 206. For example, the inking input is analyzed and converted into a mathematical equation, a shape, a chemistry equation, or a music score, or content 112 within the content authoring canvas 114 is revised based on the inking input. The method 680 ends at OPERATION 699.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
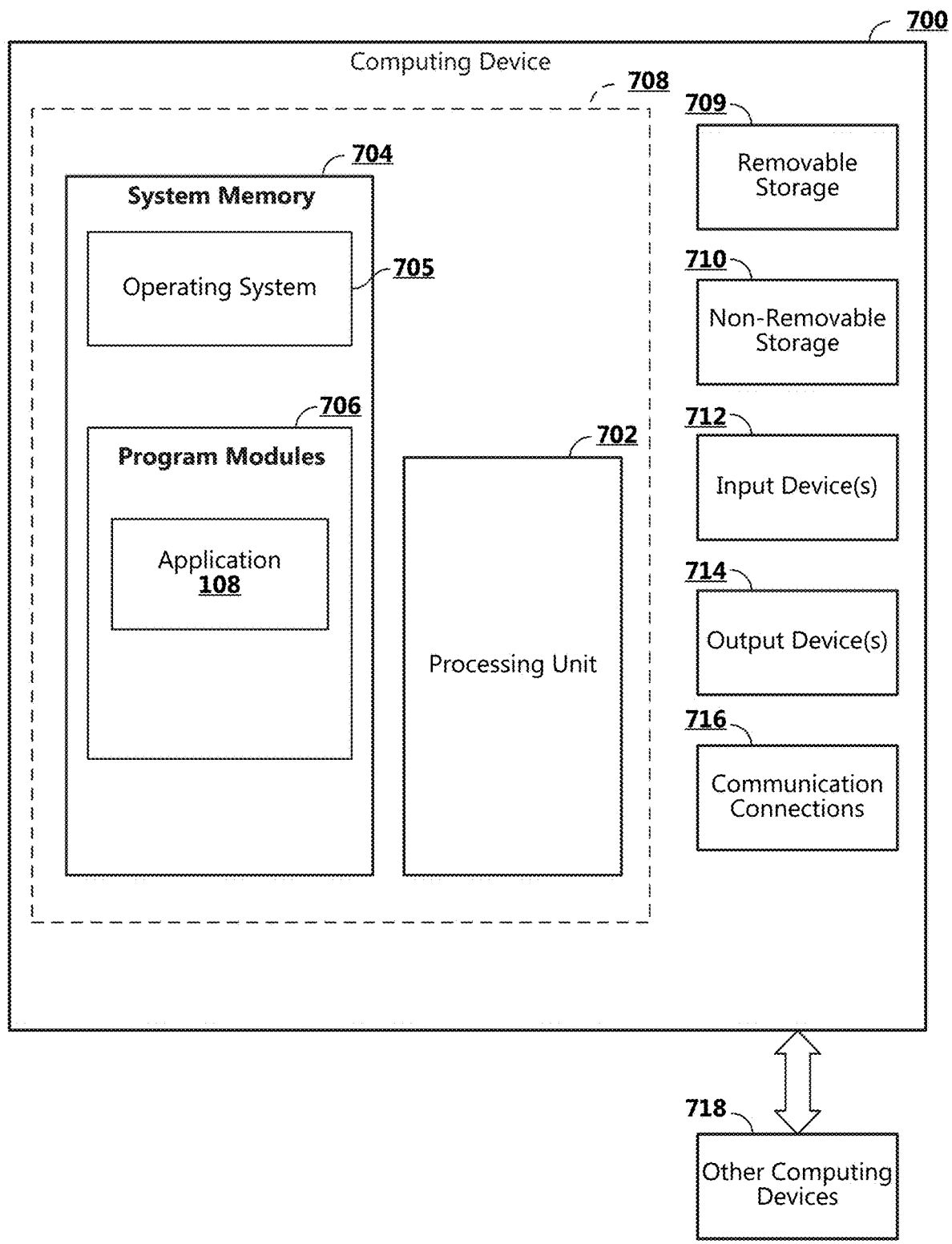
FIG. 7 is a block diagram illustrating example physical components of a computing device.
Figure 8A:
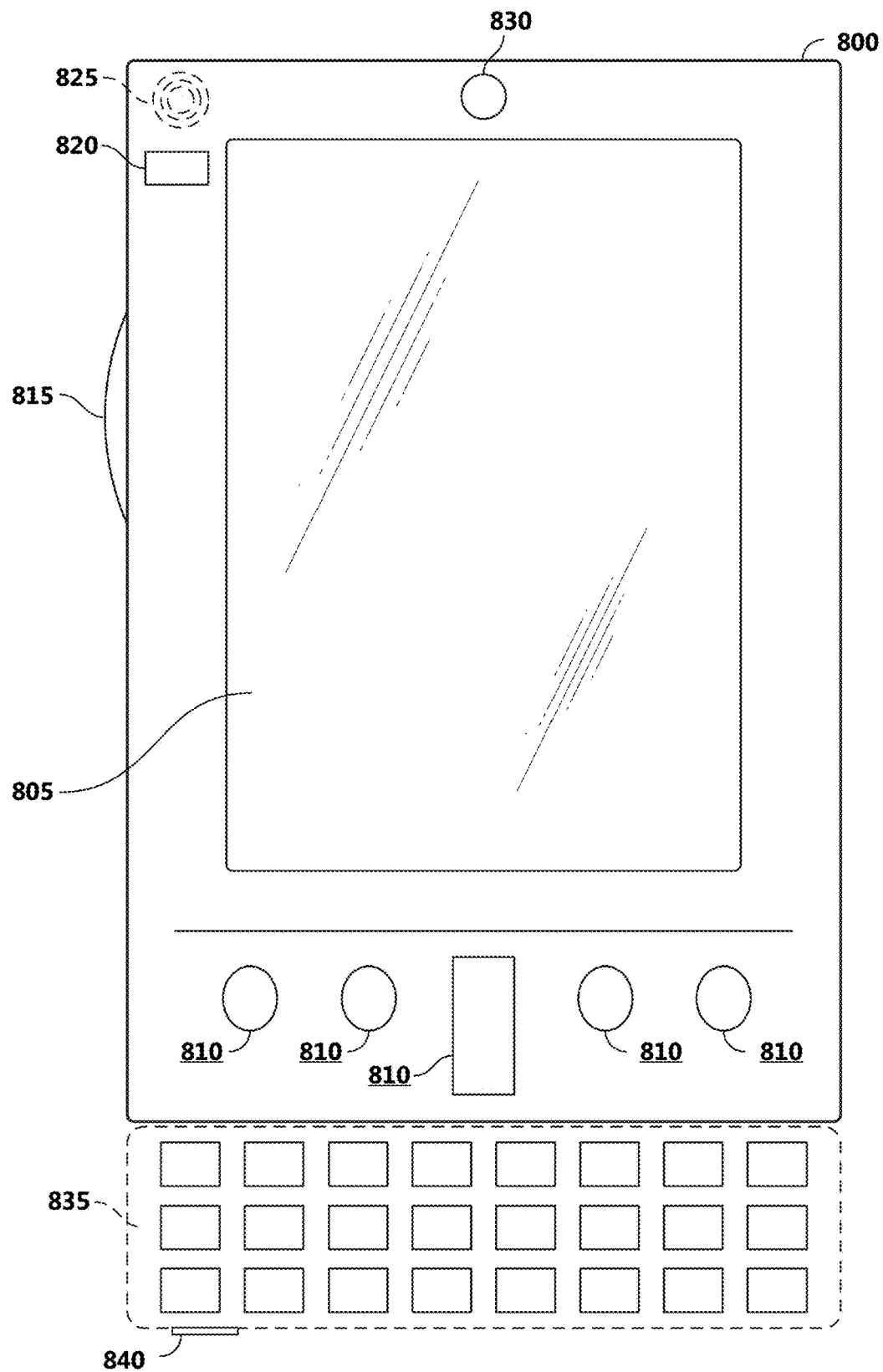
FIGS. 8A and 8B are simplified block diagrams of a mobile computing device.
Figure 8B:
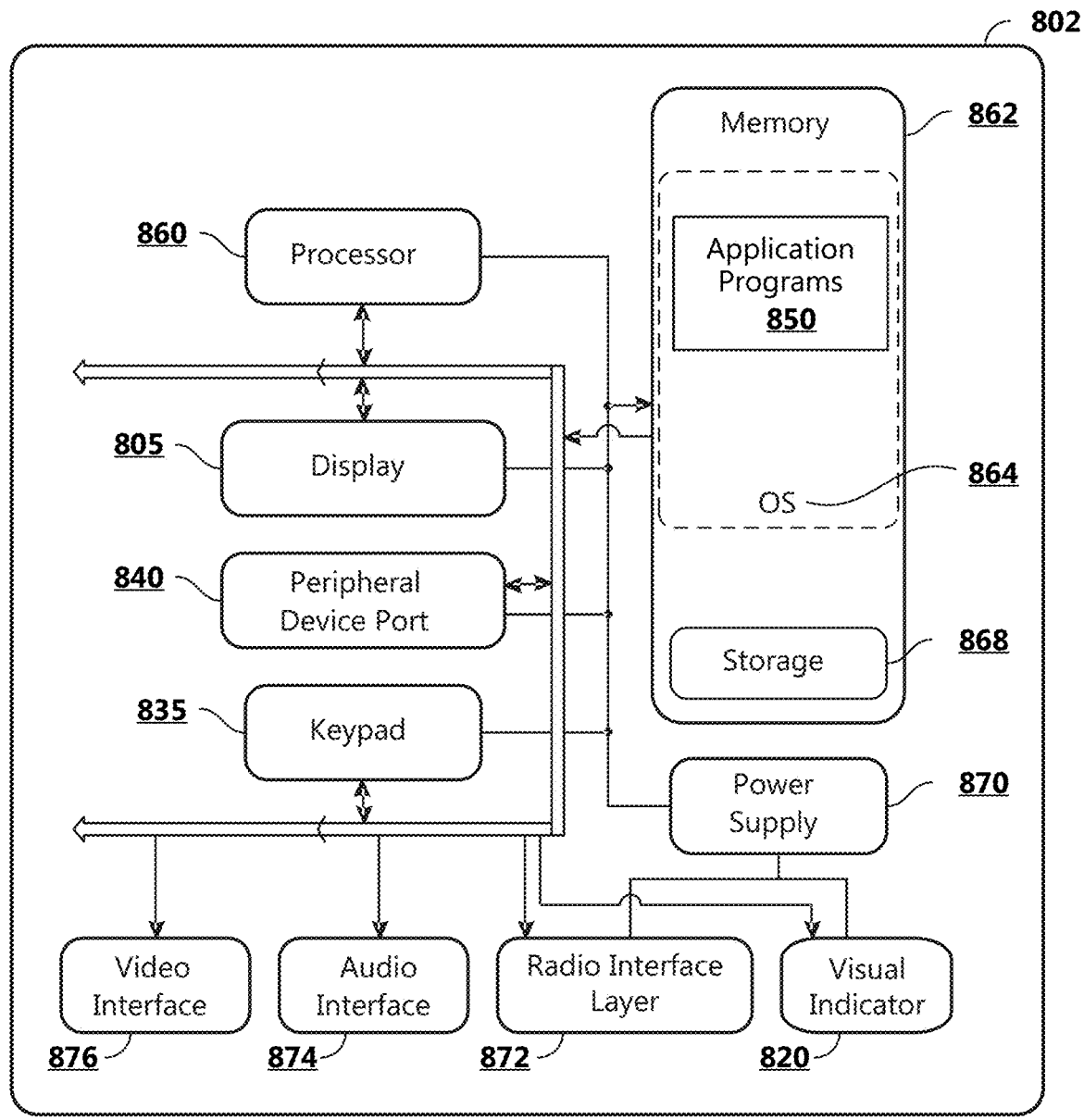
Figure 9:
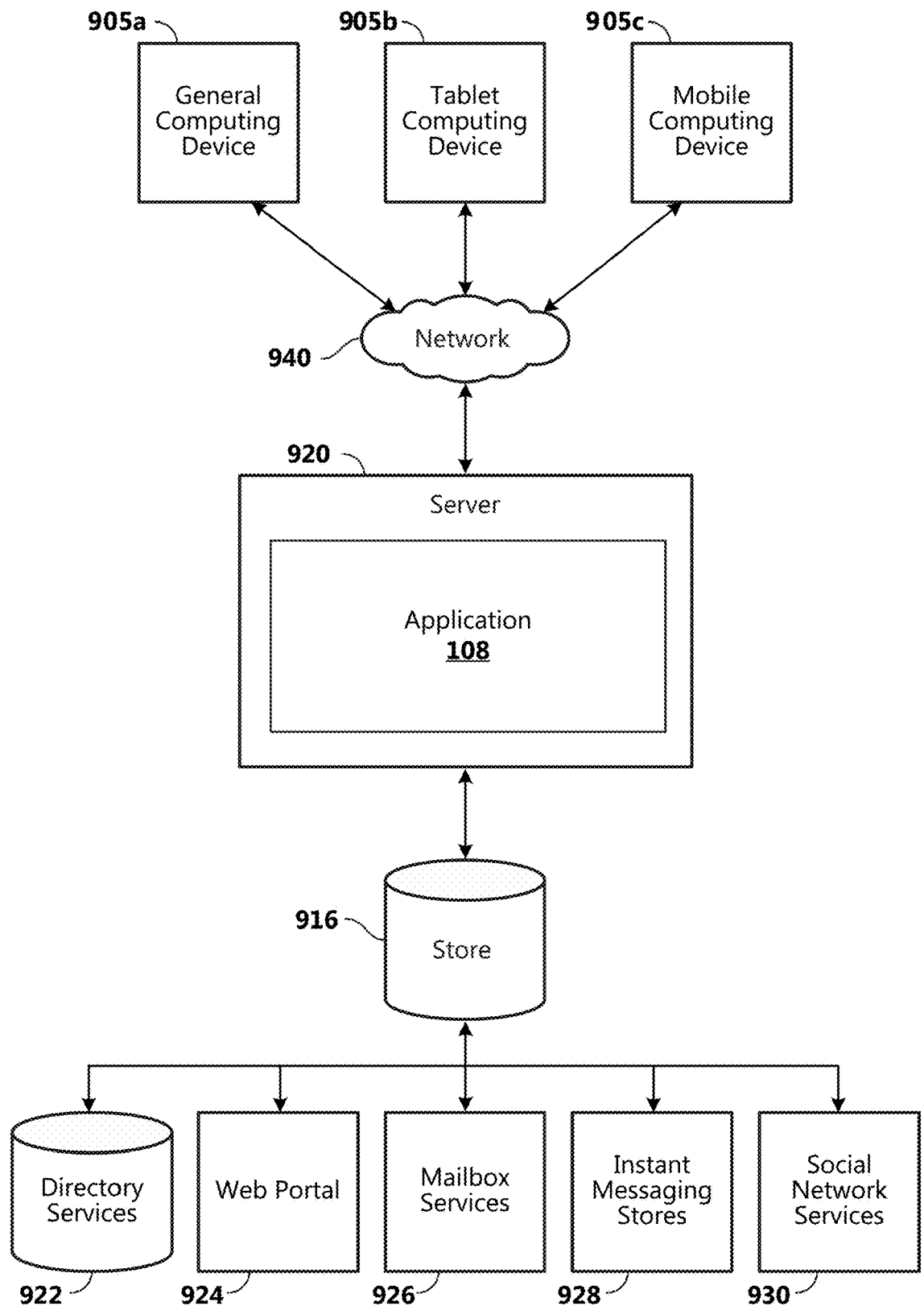
FIG. 9 is a simplified block diagram of a distributed computing system.

FIGS. 7-9 and the associated descriptions provide a discussion of a variety of operating environments in which examples are practiced. However, the devices and systems illustrated and discussed with respect to FIGS. 7-9 are for purposes of example and illustration and are not limiting of a vast number of computing device configurations that are utilized for practicing aspects, described herein.

FIG. 7 is a block diagram illustrating physical components (i.e., hardware) of a computing device 700 with which examples of the present disclosure may be practiced. In a basic configuration, the computing device 700 includes at least one processing unit 702 and a system memory 704. According to an aspect, depending on the configuration and type of computing device, the system memory 704 comprises, but is not limited to, volatile storage (e.g., random access memory), non-volatile storage (e.g., read-only memory), flash memory, or any combination of such memories. According to an aspect, the system memory 704 includes an operating system 705 and one or more program modules 706 suitable for running software applications 750. According to an aspect, the system memory 704 includes the ink-enabled application 108. The operating system 705, for example, is suitable for controlling the operation of the computing device 700. Furthermore, aspects are practiced in conjunction with a graphics library, other operating systems, or any other application program, and are not limited to any particular application or system. This basic configuration is illustrated in FIG. 7 by those components within a dashed line 708. According to an aspect, the computing device 700 has additional features or functionality. For example, according to an aspect, the computing device 700 includes additional data storage devices (removable and/or non-removable) such as, for example, magnetic disks, optical disks, or tape. Such additional storage is illustrated in FIG. 7 by a removable storage device 709 and a non-removable storage device 710.

As stated above, according to an aspect, a number of program modules and data files are stored in the system memory 704. While executing on the processing unit 702, the program modules 706 (e.g., ink-enabled application 108) perform processes including, but not limited to, one or more of the stages of the methods 600, 626, 654, 680 illustrated in FIGS. 6A-D. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 7 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 700 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 700 has one or more input device(s) 712 such as a keyboard, a mouse, a pen, a sound input device, a touch input device, etc. The output device(s) 714 such as a display, speakers, a printer, etc. are also included according to an aspect. The aforementioned devices are examples and others may be used. According to an aspect, the computing device 700 includes one or more communication connections 716 allowing communications with other computing devices 718. Examples of suitable communication connections 716 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. According to an aspect, any such computer storage media is part of the computing device 700. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which aspects may be practiced. With reference to FIG. 8A, an example of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. According to an aspect, the display 805 of the mobile computing device 800 functions as an input device (e.g., a touch screen display). If included, an optional side input element 815 allows further user input. According to an aspect, the side input element 815 is a rotary switch, a button, or any other type of manual input element. In alternative examples, mobile computing device 800 incorporates more or less input elements. For example, the display 805 may not be a touch screen in some examples. In alternative examples, the mobile computing device 800 is a portable phone system, such as a cellular phone. According to an aspect, the mobile computing device 800 includes an optional keypad 835. According to an aspect, the optional keypad 835 is a physical keypad. According to another aspect, the optional keypad 835 is a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 800 incorporates peripheral device port 840, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 incorporates a system (i.e., an architecture) 802 to implement some examples. In one example, the system 802 is implemented as a "smart phone" capable of running one or more applications (e.g., browser, e-mail, calendaring, contact managers, messaging clients, games, and media clients/players). In some examples, the system 802 is integrated as a computing device, such as an integrated personal digital assistant (PDA) and wireless phone.

According to an aspect, one or more application programs 850 are loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. According to an aspect, the ink-enabled application 108 is loaded into memory 862. The system 802 also includes a non-volatile storage area 868 within the memory 862. The non-volatile storage area 868 is used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

According to an aspect, the system 802 has a power supply 870, which is implemented as one or more batteries. According to an aspect, the power supply 870 further includes an external power source, such as an AC adapter or a powered docking cradle that supplements or recharges the batteries.

According to an aspect, the system 802 includes a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

According to an aspect, the visual indicator 820 is used to provide visual notifications and/or an audio interface 874 is used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. According to an aspect, the system 802 further includes a video interface 876 that enables an operation of an on-board camera 830 to record still images, video stream, and the like.

According to an aspect, a mobile computing device 800 implementing the system 802 has additional features or functionality. For example, the mobile computing device 800 includes additional data storage devices (removable and/or non-removable) such as, magnetic disks, optical disks, or tape. Such additional storage is illustrated in FIG. 8B by the non-volatile storage area 868.

According to an aspect, data/information generated or captured by the mobile computing device 800 and stored via the system 802 is stored locally on the mobile computing device 800, as described above. According to another aspect, the data is stored on any number of storage media that is accessible by the device via the radio 872 or via a wired connection between the mobile computing device 800 and a separate computing device associated with the mobile computing device 800, for example, a server computer in a distributed computing network, such as the Internet. As should be appreciated such data/information is accessible via the mobile computing device 800 via the radio 872 or via a distributed computing network. Similarly, according to an aspect, such data/information is readily transferred between computing devices for storage and use according to well-known data/information transfer and storage means, including electronic mail and collaborative data/information sharing systems.

FIG. 9 illustrates one example of the architecture of a system for providing an action tool-integrated inking input tool as described above. Content developed, interacted with, or edited in association with the ink-enabled application 108 is enabled to be stored in different communication channels or other storage types. For example, various documents may be stored using a directory service 922, a web portal 924, a mailbox service 926, an instant messaging store 928, or a social networking site 930. The ink-enabled application 108 is operative to use any of these types of systems or the like for providing an action tool-integrated inking input tool, as described herein. According to an aspect, a server 920 provides the ink-enabled application 108 to clients 905a,b,c. As one example, the server 920 is a web server providing the ink-enabled application 108 over the web. The server 920 provides the ink-enabled application 108 over the web to clients 905 through a network 940. By way of example, the client computing device is implemented and embodied in a personal computer 905a, a tablet computing device 905b or a mobile computing device 905c (e.g., a smart phone), or other computing device. Any of these examples of the client computing device are operable to obtain content from the store 916.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing an action-enabled inking tool, the method comprising:
   displaying a user interface of an application within a display of an electronic computing device, the user interface comprising a content authoring canvas and a plurality of inking tools for editing content in the content authoring canvas;
   receiving a selection of an inking tool from the plurality of inking tools and displaying a first customization menu to allow a user to select properties and a functionality for the inking tool;
   receiving a selection of the properties and the functionality for the inking tool and setting the inking tool to have the selected properties and the selected functionality for editing the content;
   based on a type of the selected functionality, displaying a second customization menu to allow the user to select a plurality of properties specific to the type of the selected functionality, wherein the plurality of properties specific to the type of the selected functionality are associated with commands for editing the content;
   receiving a selection of a plurality of properties specific to the type of the selected functionality and selected from the second customization menu, and applying the plurality of properties selected from the second customization menu to the inking tool;
   receiving inking input via the inking tool
   analyzing the inking input to identify a first portion of the inking input that corresponds to a first property of the plurality of properties selected from the second customization menu;
   analyzing the inking input to identify a second portion of the inking input that corresponds to a second property of the plurality of properties selected from the second customization menu;
   executing one or more commands associated with the first property of the plurality of properties to edit the content in accordance with the selected first property; and
   executing one or more commands associated with the second property of the plurality of properties to edit the content in accordance with the selected second property.

2. The method of claim 1, further comprising persistently highlighting the inking tool.

3. The method of claim 1, wherein displaying the first customization menu further comprises displaying a plurality of action tools for allowing the user to select the inking tool.

4. The method of claim 3, wherein each of the plurality of action tools has an associated functionality, the associated functionality comprising one of the following:
   converting the inking input to a shape;
   converting the inking input to a mathematical equation;
   revising content based on the inking input;
   converting the inking input to a chemical equation; and
   converting the inking input to a music score.

5. The method of claim 4, wherein the selection of the inking tool comprises selecting an action tool displayed in the first customization menu.

6. The method of claim 5, wherein displaying the user interface comprises displaying a toolbar, the toolbar comprising the inking tool; and
   setting the inking tool to have the selected properties and the selected functionality further comprises updating the display of the inking tool in the toolbar to illustrate the selected functionality.

7. The method of claim 6, wherein updating the display of the inking tool to illustrate the selected functionality comprises updating the display of the inking tool to include an icon corresponding to the selected functionality, wherein the icon comprises one of the following:
   the icon corresponding to converting inking input to a shape includes a geometric shape;
   the icon corresponding to converting inking input to a mathematical equation includes a mathematical symbol;
   the icon corresponding to revising content based on inking input includes at least one proofreading symbol;

the icon corresponding to converting inking input to a chemical equation includes a chemical symbol; and the icon corresponding to converting inking input to a music score includes a musical symbol.

8. The method of claim 1, wherein displaying the user interface comprises displaying the inking tool having a functionality associated with one of the following:
   converting inking input to a shape;
   converting inking input to a mathematical equation;
   revising content based on inking input;
   converting inking input to a chemical equation; and
   converting inking input to a music score.

9. The method of claim 1, wherein each of the plurality of inking tools has a separate functionality, the separate functionality comprising one of the following:
   converting inking input to a shape;
   converting inking input to a mathematical equation;
   revising content based on inking input;
   converting inking input to a chemical equation; and
   converting inking input to a music score.

10. The method of claim 1, wherein displaying the first customization menu comprises displaying the first customization menu to allow the user to select one or more properties for the inking tool selected from the following:
    a color;
    a stroke thickness; and
    an ink effect.

11. The method of claim 10, wherein setting the inking tool to have the selected properties further comprises updating the display of the inking tool to illustrate the selected properties.

12. The method of claim 11, wherein updating the display of the inking tool to illustrate the selected properties comprises updating the inking tool to illustrate the selected color and stroke thickness.

13. A method for providing an action-enabled inking tool, comprising:
    displaying a user interface of an application within a display of an electronic computing device, the user interface comprising a content authoring canvas and a plurality of inking tools having properties;
    receiving a selection of an inking tool from the plurality of inking tools and displaying a first customization menu to allow a user to select a functionality for the inking tool;
    responsive to a selection of the functionality for the inking tool, setting the inking tool to have the selected functionality;
    based on a type of the selected functionality, displaying a second customization menu to allow the user to select a plurality of properties specific to the type of the selected functionality, wherein the plurality of properties specific to the type of the selected functionality are associated with commands for editing content, and a selected property from the second customization menu is applied to the inking tool;
    receiving a selection of a plurality of properties specific to the type of the selected functionality and selected from the second customization menu, and applying the plurality of properties selected from the second customization menu to the inking tool;
    receiving an inking input via the inking tool;
    analyzing the inking input to identify a first portion of the inking input that corresponds to a first property of the plurality of properties selected from the second customization menu;
    analyzing the inking input to identify a second portion of the inking input that corresponds to a second property of the plurality of properties selected from the second customization menu;
    executing one or more commands associated with the first property of the plurality of properties to edit the content in accordance with the selected first property; and
    executing one or more commands associated with the second property of the plurality of properties to edit the content in accordance with the selected second property.

14. The method of claim 13, wherein displaying the first customization menu comprises displaying functionalities comprising:
    a functionality for converting the inking input to a shape;
    a functionality for converting the inking input to a mathematical equation;
    a functionality for revising content based on the inking input;
    a functionality for converting the inking input to a chemical equation; and
    a functionality for converting the inking input to a music score.

15. The method of claim 14, wherein:
    displaying the user interface comprises displaying a toolbar, the toolbar comprising the inking tool; and
    setting the inking tool to have the selected functionality further comprises updating the display of the inking tool in the toolbar to illustrate the selected functionality.

16. The method of claim 15, wherein updating the display of the inking tool to illustrate the selected functionality comprises updating the display of the inking tool to include an icon corresponding to the selected functionality, wherein updating the display of the inking tool comprises to include one of the following:
    the icon corresponding to converting inking input to a shape includes a geometric shape;
    the icon corresponding to converting inking input to a mathematical equation includes a mathematical symbol;
    the icon corresponding to revising content based on inking input includes at least one proofreading symbol;
    the icon corresponding to converting inking input to a chemical equation includes a chemical symbol; and
    the icon corresponding to converting inking input to a music score includes a musical symbol.

17. The method of claim 13, further comprising persistently highlighting the inking tool.

18. A system for providing an action-enabled inking tool, the system comprising:
    a processing device; and
    a computer readable data storage device storing instructions that, when executed by the processing device, cause the system to:
    display a user interface within a display of an electronic computing device, the user interface comprising a content authoring canvas and a plurality of inking tools for editing content in the content authoring canvas;
    in response to a selection of an inking tool from the plurality of inking tools, display a first customization menu to allow a user to select a functionality for the inking tool;
    in response to a selection of the functionality for the inking tool, set the inking tool to have the selected functionality for editing the content;

based on a type of the selected functionality, display a second customization menu to allow the user to select a plurality of properties specific to the type of the selected functionality, wherein the plurality of properties specific to the type of the selected functionality are associated with commands for editing the content;

in response to a selection of a plurality of properties specific to the type of the selected functionality and selected from the second customization menu, apply the plurality of properties selected from the second customization menu to the inking tool;

in response to receiving inking input via the inking tool:
    analyze the inking input to identify a first portion of the inking input that corresponds to a first property of the plurality of properties selected from the second customization menu;
    analyze the inking input to identify a second portion of the inking input that corresponds to a second property of the plurality of properties selected from the second customization menu;
    execute one or more commands associated with the first property of the plurality of properties to edit the content in accordance with the selected first property; and
    execute one or more commands associated with the second property of the plurality of properties to edit the content in accordance with the selected second property.

19. The system of claim 18, wherein the functionality associated with the selected inking tool comprises at least one of the following:
    a functionality for converting inking input to a shape;
    a functionality for converting inking input to a mathematical equation;
    a functionality for revising content based on inking input;
    a functionality for converting inking input to a chemical equation; and
    a functionality for converting inking input to a music score.

* * * * *